US 12,557,075 B2

United States Patent
Abotabl et al.

(10) Patent No.: US 12,557,075 B2
(45) Date of Patent: Feb. 17, 2026

(54) SLOT TYPE DEPENDENT VRB-TO-PRB INTERLEAVING IN FULL DUPLEX NETWORKS

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 361 days.

(21) Appl. No.: 17/821,458

(22) Filed: Aug. 22, 2022

(65) Prior Publication Data
US 2024/0064704 A1  Feb. 22, 2024

(51) Int. Cl.
*H04W 72/04* (2023.01)
(52) U.S. Cl.
CPC .................................. *H04W 72/04* (2013.01)
(58) Field of Classification Search
CPC .. H04W 72/04; H04W 72/0457; H04L 5/0044
See application file for complete search history.

(56) References Cited

U.S. PATENT DOCUMENTS

| | | | | |
|---|---|---|---|---|
| 2020/0267511 A1* | 8/2020 | Abdoli | ................... | H04W 76/11 |
| 2020/0267698 A1* | 8/2020 | Xing | ..................... | H04W 72/02 |
| 2021/0288852 A1* | 9/2021 | Jia | ......................... | H04W 72/23 |
| 2022/0393847 A1* | 12/2022 | Moon | ................... | H04L 5/1438 |
| 2023/0136550 A1* | 5/2023 | Lei | ........................ | H04L 5/0044 |
| | | | | 370/329 |
| 2024/0039655 A1* | 2/2024 | Rudolf | ................. | H04L 1/0016 |
| 2024/0284411 A1* | 8/2024 | Li | ..................... | H04W 74/0808 |
| 2024/0381444 A1* | 11/2024 | Han | .................. | H04W 74/0833 |
| 2024/0388413 A1* | 11/2024 | You | ...................... | H04J 11/0023 |
| 2025/0038911 A1* | 1/2025 | Zhang | ............... | H04W 72/0453 |

OTHER PUBLICATIONS

3GPP: "3rd Generation Partnership Project; Technical Specification Group Radio Access Network, NR, Physical Layer Procedures for Data (Release 17)", TS 38.214, V17.2.0, Jun. 2022, 227 Pages, Sections 5.1.2.2.1, 5.1.2.2.2, and 5.1.2.3.
Samsung (Moderator): "Draft SID on Evolution of NR Duplex Operation", RP-212707, 3GPP TSG RAN#94-e, Electronic Meeting, Dec. 6-17, 2021, 4 Pages.

* cited by examiner

*Primary Examiner* — Kan Yuen
(74) *Attorney, Agent, or Firm* — QUALCOMM Incorporated

(57) ABSTRACT

Method and apparatus for slot type dependent VRB-to-PRB interleaving. The apparatus allocates a set of resources for communication with a UE, the set of resources comprising a plurality of RBs. The apparatus maps a first subset of the set of resources and a second subset of the set of resources within at least a first subband within a first bandwidth part (BWP), wherein the first subset and the second subset are interleaved within the first subband based at least on an overlap between the first BWP and at least the first subband. A first RB of the first BWP corresponds to a first RB of the first subset in response to the first BWP having a starting position within the first subband and having an ending position within a second subband, wherein the first subband and the second subband are different.

36 Claims, 17 Drawing Sheets

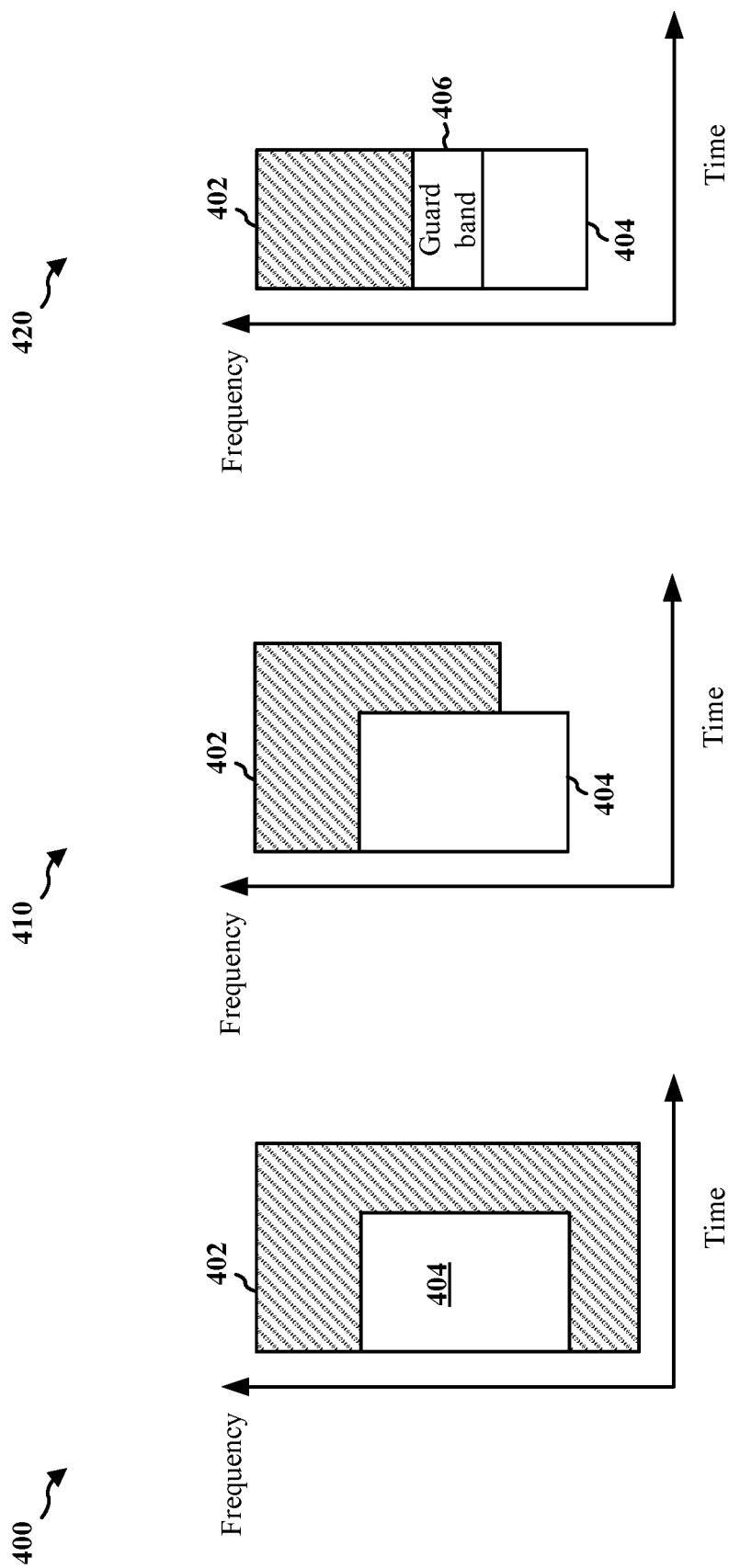

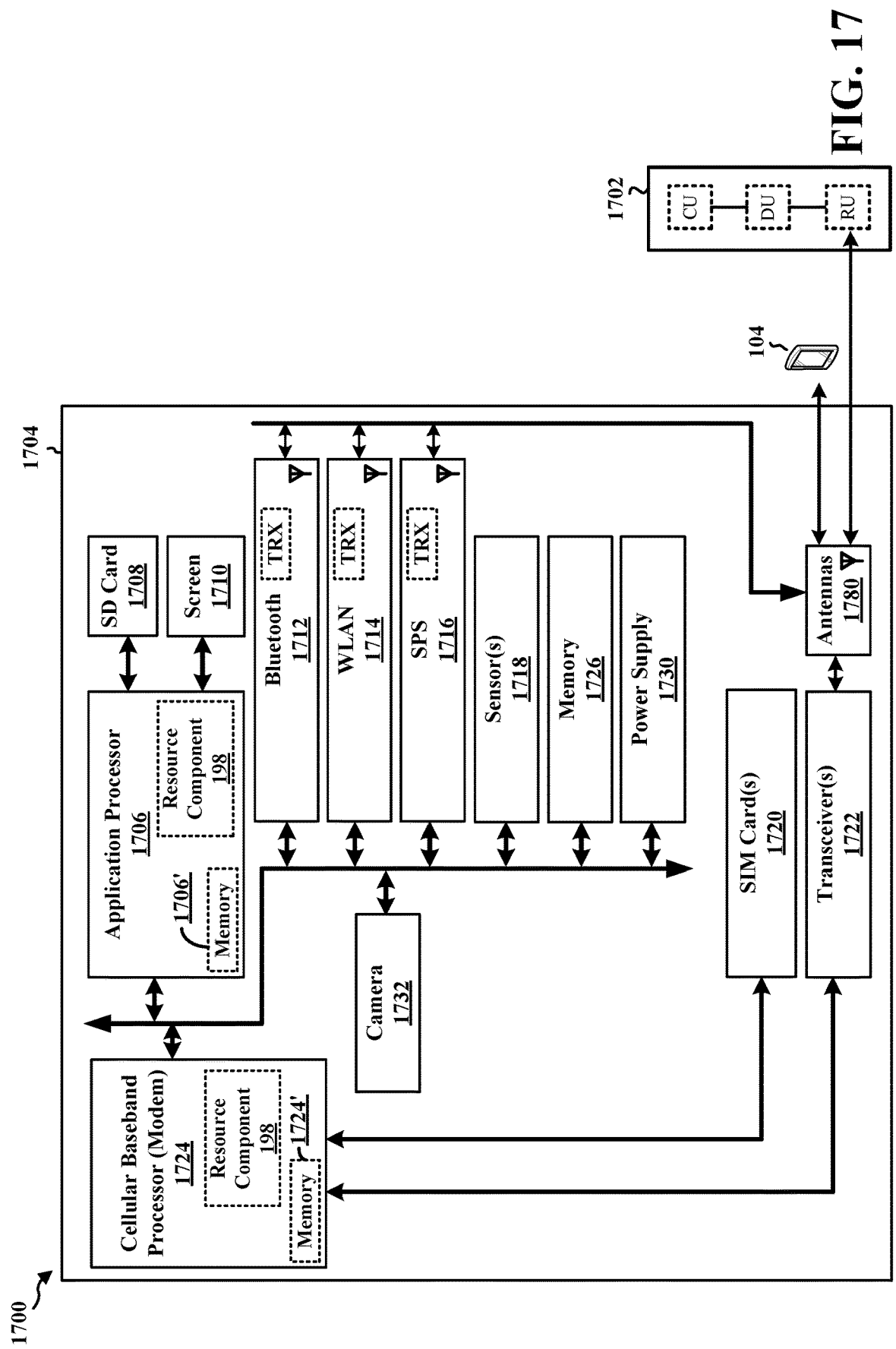

SLOT TYPE DEPENDENT VRB-TO-PRB INTERLEAVING IN FULL DUPLEX NETWORKS

TECHNICAL FIELD

The present disclosure relates generally to communication systems, and more particularly, to a configuration for slot type dependent virtual resource block (VRB) to physical resource block (PRB) interleaving.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives an allocation of a set of resources for communication with a network entity, the set of resources comprising a plurality of resource blocks (RBs). The apparatus de-interleaves the set of resources to obtain a first subset of the set of resources and a second subset of the set of resources within at least a first subband within a first bandwidth part (BWP), wherein the first subset and the second subset are interleaved within the first subband based at least on an overlap between the first BWP and at least the first subband In an aspect of the disclosure, a method, a computer-readable medium, and an apparatus are provided. The apparatus may be a device at a network node. The device may be a processor and/or a modem at a network node or the network node itself. The apparatus allocates a set of resources for communication with a user equipment (UE), the set of resources comprising a plurality of resource blocks (RBs). The apparatus maps a first subset of the set of resources and a second subset of the set of resources within at least a first subband within a first bandwidth part (BWP), wherein the first subset and the second subset are interleaved within the first subband based at least on an overlap between the first BWP and at least the first subband.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIGS. 4A-4C are diagrams illustrating examples of full duplex communication.

FIG. 17 is a diagram illustrating an example of a hardware implementation for an example apparatus and/or network entity.

DETAILED DESCRIPTION

Figure 1:
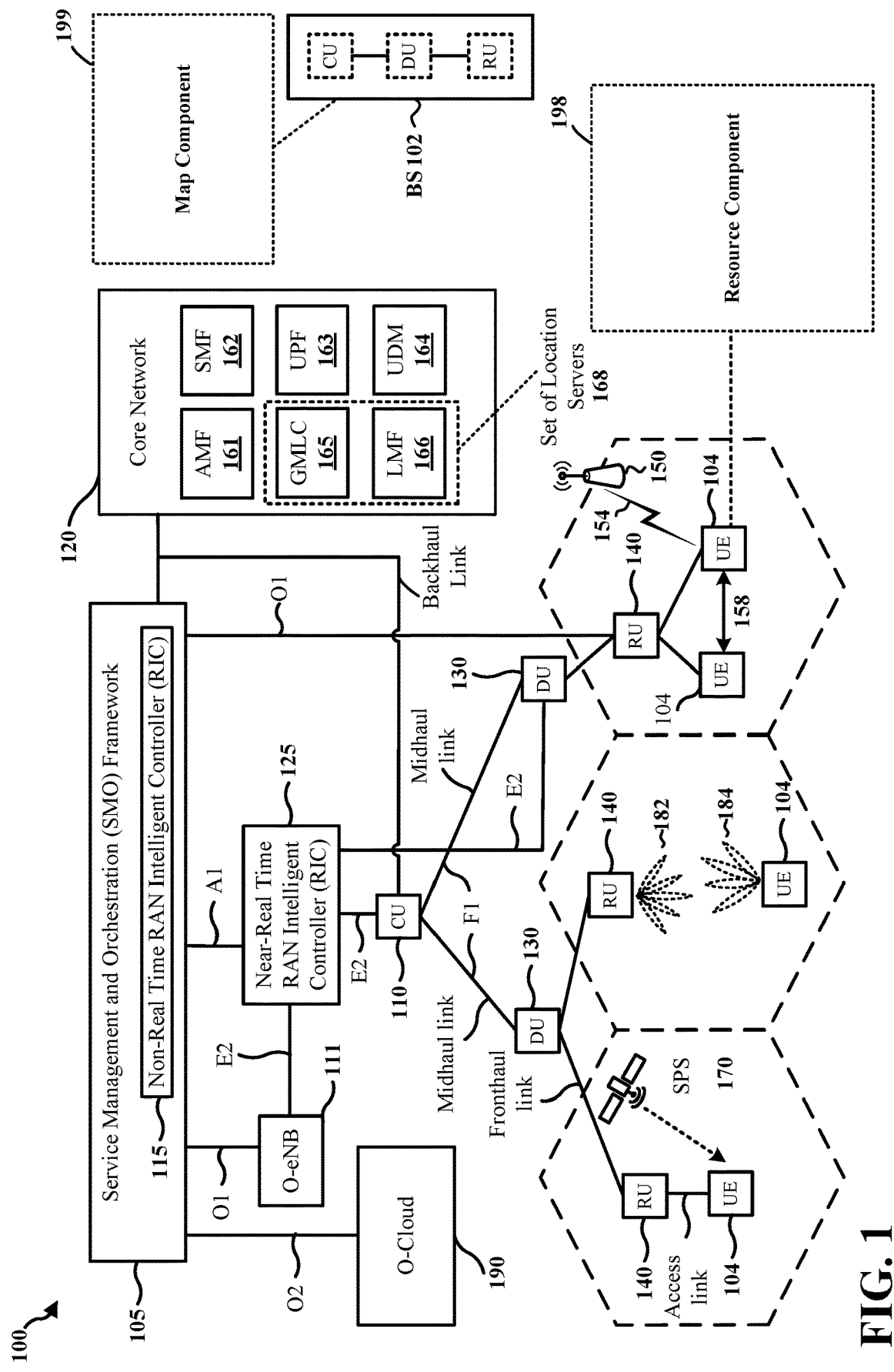
FIG. 1 is a diagram illustrating an example of a wireless communications system and an access network.

In wireless communication, full duplex (FD) capability may be present at base stations, UEs, or both. At least one advantage of FD is a reduction of latency. For example, FD may allow for the reception of downlink in uplink only slots, which may enable latency savings. At least another advantage of FD may include an enhancement of spectrum efficiency per cell or per UE, as well as an increase in resource utilization. In instances where VRB-to-PRB mapping is enabled, interleaving may be performed such that the first allocated L_i RBs are separated by half the BWP from the adjacent L_i allocated RBs. VRB-to-PRB mapping may be governed by L_i and the separation between adjacent allocated RBs. The separation between adjacent allocated L_i RBs may be based on the BWP. Subband FD slots may comprise both DL and UL separated by a guard band. However, due to the different frequency allocation, part of the BWP may overlap with a corresponding subband. VRB-to-PRB mapping is defined on a per BWP basis which may result in an allocation that is outside or beyond the band. For example, in some instances, some DL RBs may be mapped to fall within the UL subband, while in some instances, some UL RBs may be mapped to fall within the DL subband. The mapping of RBs in conflicting subbands may negatively impact communications.

Aspects presented herein provide a configuration for VRB-to-PRB interleaving based on the available subband. The VRB-to-PRB interleaving may allow for separation to be present, while also taking into account the available subband for communication to ensure that RBs are not mapped into conflicting or opposing subbands. At least one advantage of the disclosure is that the mapping of RBs may take into account a conflicting subband and map the RBs into corresponding subband. The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a resource component 198 configured to receive an allocation of a set of resources for communication with a network entity, the set of resources comprising a plurality of RBs; and de-interleave the set of resources to obtain a first subset of the set of resources and a second subset of the set of resources within at least a first subband within a first BWP, wherein the first subset and the second subset are interleaved within the first subband based at least on an overlap between the first BWP and at least the first subband.

Referring again to FIG. 1, in certain aspects, the base station 102 may comprise a map component 199 configured to allocate a set of resources for communication with a UE, the set of resources comprising a plurality of RBs; and map a first subset of the set of resources and a second subset of the set of resources within at least a first subband within a first BWP, wherein the first subset and the second subset are interleaved within the first subband based at least on an overlap between the first BWP and at least the first subband.

Although the following description may be focused on 5G NR, the concepts described herein may be applicable to other similar areas, such as LTE, LTE-A, CDMA, GSM, and other wireless technologies.

Figure 2:
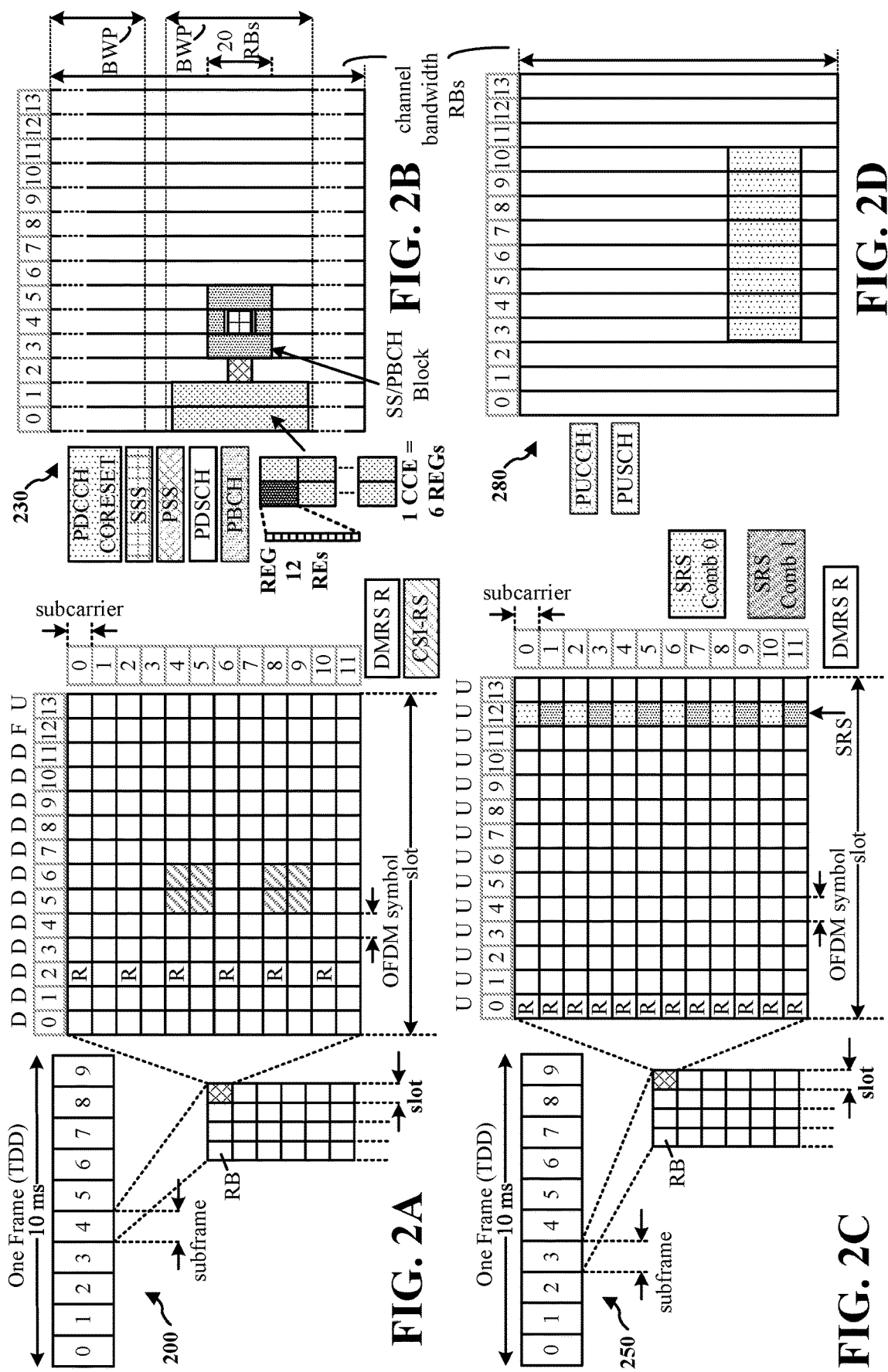
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |

TABLE 1-continued

Numerology, SCS, and CP

| μ | SCS $\Delta f = 2^\mu \cdot 15[kHz]$ | Cyclic prefix |
|---|---|---|
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology ii, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology 1.1=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
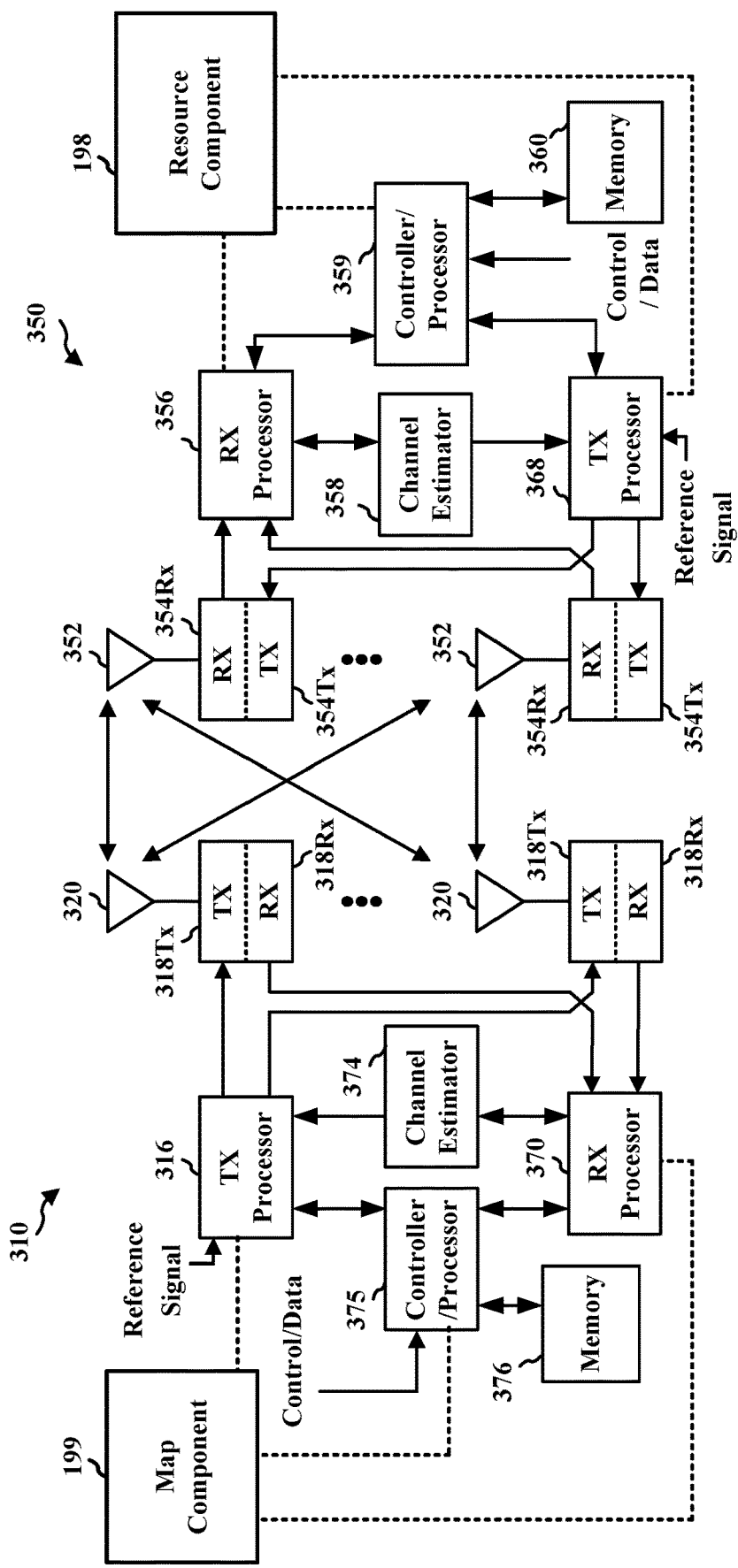
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIB s) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the resource component 198 of FIG. 1.

At least one of the TX processor 316, the RX processor 370, and the controller/processor 375 may be configured to perform aspects in connection with the map component 199 of FIG. 1.

In wireless communication, FD capability may be present at base stations, UEs, or both. For example, at UEs, uplink transmissions may occur at one panel, while downlink receptions may occur at another panel. At base stations, uplink transmissions may occur at one panel, while downlink receptions may occur in another panel. At least one advantage of FD is a reduction of latency. For example, FD may allow for the reception of downlink in uplink only slots, which may enable latency savings. At least another advantage of FD may include an enhancement of spectrum efficiency per cell or per UE, as well as an increase in resource utilization.

FIGS. 4A-4C are diagrams illustrating examples of FD communication. Diagram 400 of FIG. 4A and diagram 410 of FIG. 4B include downlink 402 and uplink 404 resources. Diagrams 400 and 410 are examples of in-band full duplex where transmissions and receptions are on the same time and frequency resource. The downlink 402 and uplink 404 resources share the same in-band full duplex time and frequency resources such that there is a full overlap, as shown in diagram 400 of FIG. 4A, or a partial overlap as shown in diagram 410 of FIG. 4B. Diagram 420 of FIG. 4C also includes downlink 402 and uplink 404 resources but are separated by a guard band 406. Diagram 420 is an example of sub-band frequency domain duplexing, which may also be known as flexible duplex. The transmissions and receptions are at the same time but are on different frequency resources. The downlink 402 and uplink 404 resources may be separated from each other in the frequency domain.

Figure 5C:
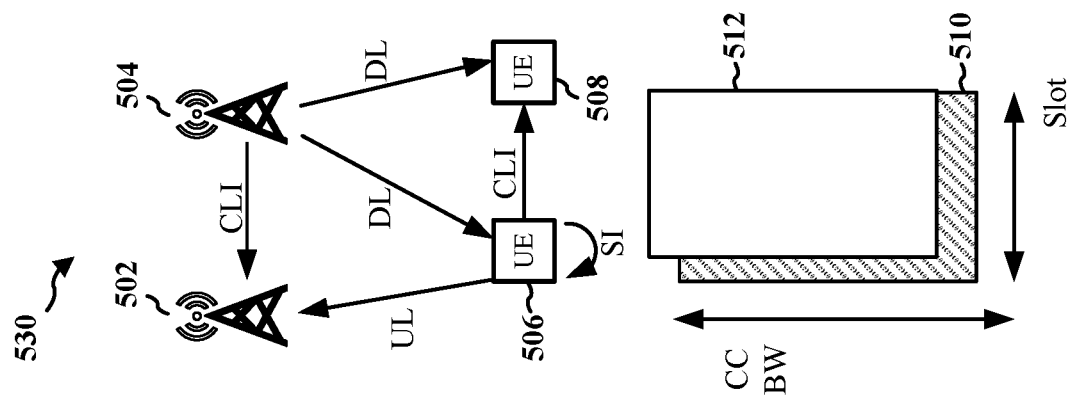
FIGS. 5A-5C are diagrams illustrating examples of full duplex communication.
Figure 5B:
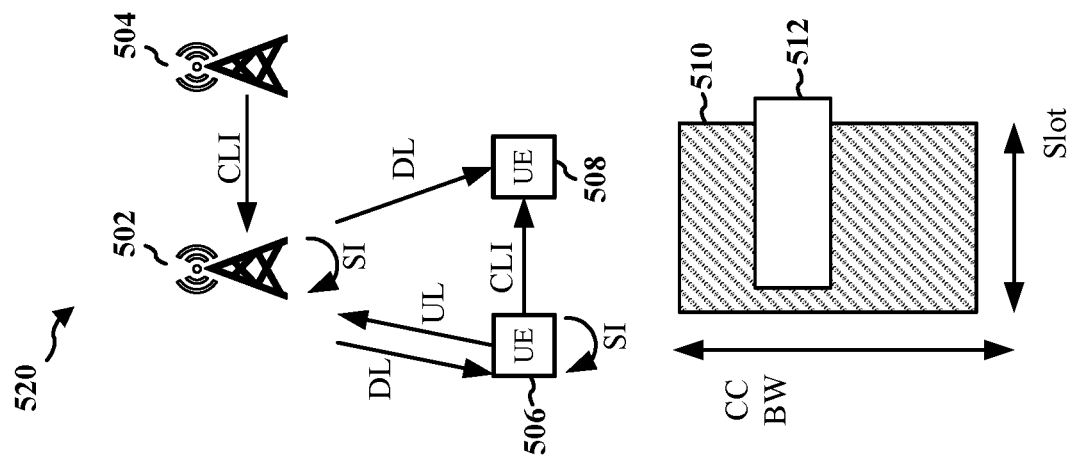
Figure 5A:
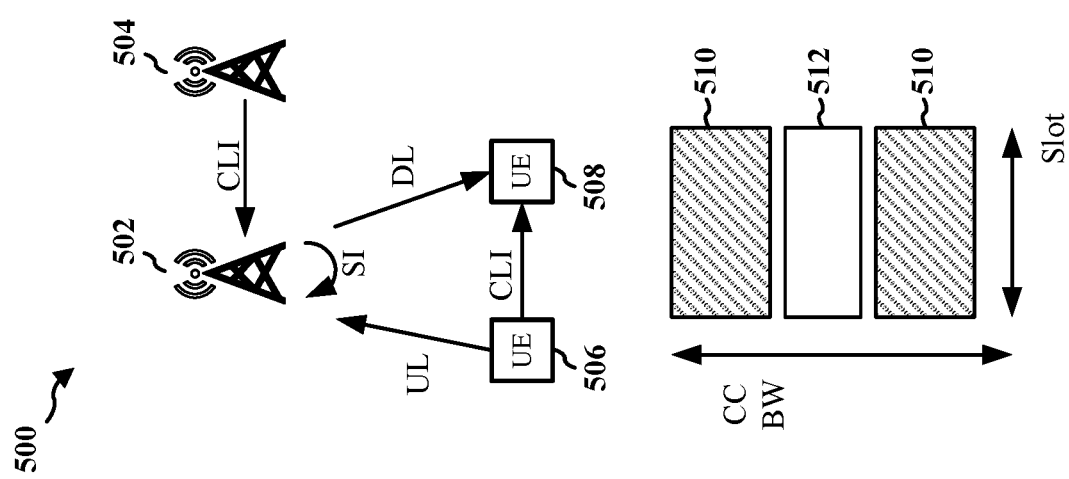

FIGS. 5A-5C are diagrams illustrating examples of FD communication. Diagram 500 is an example of a base station operating in subband full duplex mode, where the band is split between downlink 510 and uplink 512 resources. The base station 502 is operating in full duplex while the UE 506 and UE 508 are operating in half duplex. The base station 502 may receive uplink (UL) transmissions from UE 506 and may transmit downlink (DL) transmissions to UE 508. The base station 502 may experience self interference (SI) while operating in full duplex based at least on the DL transmissions to the UE 508 and the UL transmission from UE 506. The base station 502 may also experience cross link interference (CLI) from other base stations (e.g., 504) that are transmitting within the network. Diagram 520 is an example of a base station and a UE both operating in in-band full duplex mode, where there is at least some partial overlap between downlink 510 and uplink 512 resources. The base station 502 may receive UL transmissions from UE 506 and transmit DL transmissions to the UE 506. The base station 502 may also transmit DL transmissions to the UE 508. The base station 502 may experience SI while operating in full duplex based at least on the DL transmissions to UE 506 or UE 508 and the UL transmission from UE 506. The base station 502 may also experience CLI from other base stations (e.g., 504) that are transmitting within the network. The UE 506 may experience SI while operating in full duplex based at least on the UL transmission to the base station 502 and reception of the DL transmission from the base station 502. Diagram 530 is an example of a base station and a UE operating in in-band full duplex mode, where there is at least some partial overlap between downlink 510 and uplink 512 resources, while the base station 502 may be a TRP associated with base station 504. The base station 504 may transmit DL transmissions to the UE 506 and the UE 508. The base station 502 may receive UL transmissions from the UE 506. The base station 502 may experience CLI based on transmissions from base station 504 that are transmitted within the network. The UE 506 may experience SI while operating in full duplex based at least on the UL transmission to the base station 502 and the DL transmissions from the base station 502.

Figure 6:
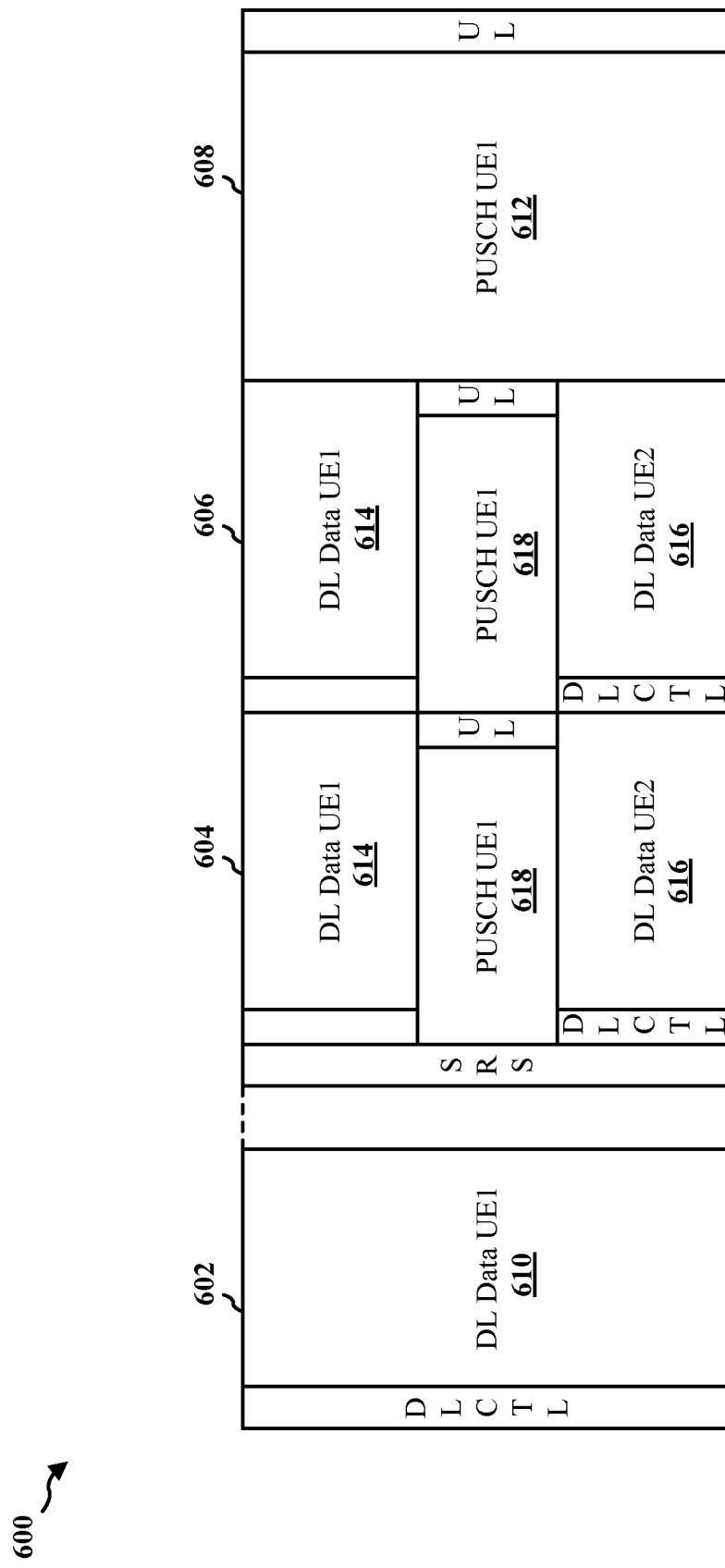
FIG. 6 is a diagram illustrating an example of a subband full duplex slot format.

FIG. 6 is a diagram illustrating an example of a subband full duplex slot format. The diagram 600 is a diagram of four slots (e.g., 602, 604, 606, 608). The first slot 602 and the last slot 608 are half duplex slots for TDD operation. The first slot 602 may comprise DL data 610, and the last slot 608 may comprise UL data (e.g., PUSCH 612). The slot 604 and slot 606 may be configured as subband FD slots. For example, slot 604 may comprise DL data 614 for a first UE (e.g., UE1) and may comprise DL data 616 for a second UE (e.g., UE2). The slot 604 may also comprise UL data (e.g., PUSCH 618) from the first UE. In yet another example, slot 606 may comprise DL data 614 for a first UE (e.g., UE1) and may comprise DL data 616 for a second UE (e.g., UE2). The slot 604 may also comprise UL data (e.g., PUSCH 618) from the first UE.

The slot format may be defined to comprise a "D+U" slot, where the "D+U" slot is a slot in which the band is used for both UL and DL transmissions. The DL and UL transmissions may occur in overlapping bands (e.g., in-band FD) or in adjacent bands (e.g., subband FD). In some instances, for a given "D+U" symbol, a half duplex UE may either transmit in the UL band or receive in the DL band. In some instances, for a given "D+U" symbol, a FD UE may transmit in the UL band and/or receive in the DL band in the same slot. A "D+U" slot may be comprised of only DL symbols, only UL symbols, or FD symbols.

Frequency domain resource allocation (FDRA) may indicate may indicate the allocated resources for transmission or reception resources in the frequency domain. The FDRA may be comprised within a DCI that schedules a PDSCH or a PUSCH. The FDRA may indicate a resource allocation type that indicates the manner in which RBs are allocated for UL or DL. The resource allocation type may comprise allocation Type 0 or Type 1. Allocation Type 0 may comprise a disjoint RB allocation where the RBs are bundled into resource block groups (RBGs). The RBs may be allocated into multiples of RBGs where the size of the RBG may be based on the size of the BWP and the configuration type. For example, the RBG size may be based on two different configurations, as shown below in Table 1.

TABLE 1

| Bandwidth Part Size | Configuration 1 | Configuration 2 |
| --- | --- | --- |
| 1-36 | 2 | 4 |
| 37-72 | 4 | 8 |
| 73-144 | 8 | 16 |
| 145-275 | 16 | 16 |

Allocation Type 1 may comprise a consecutive allocation of RBs. The resource allocation area may be determined by the parameter RB_start and the number of consecutive RBs which are combined in a specific value field known as the resource indicator value (RIV). The RIV may be defined by if $(L_{RBs}-1) \leq \lfloor N_{BWP}^{size}/2 \rfloor$ then $$RIV = N_{BWP}^{size}(L_{RBs}-1)RB_{start}$$

else $$RIV = N_{BWP}^{size}(N_{BWP}^{size}-L_{RBs}+1)+(N_{BWP}^{size}-RB_{start})$$

Figure 7:
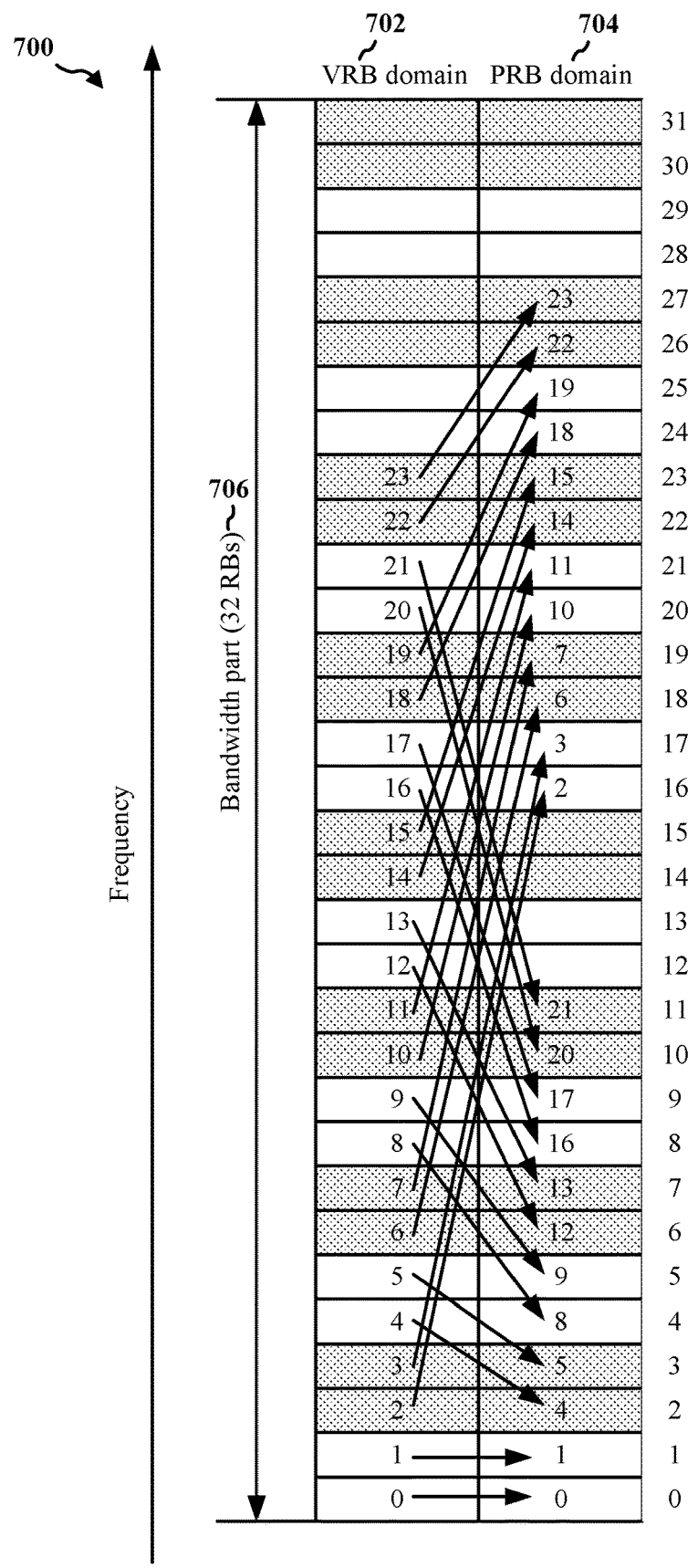
FIG. 7 is a diagram illustrating an example of virtual resource block (VRB) to physical resource block (PRB) mapping.

In instances where VRB-to-PRB mapping is enabled, interleaving may be performed such that the first allocated L_i RBs are separated by half the BWP from the adjacent L_i allocated RBs, as shown for example in diagram 700 of FIG. 7. In the diagram 700, the BWP 706 may comprise 32 RBs where 23 RBs are interleaved across the BWP 706 to achieve frequency diversity. VRB-to-PRB mapping may be governed by L_i and the separation between adjacent allocated RBs. The allocated L_i RBs comprise the number of consecutive RBs that are mapped together. In the example of diagram 700, the number of consecutive RBs that are mapped together is 2. The separation between adjacent allocated L_i RBs may be based on the BWP. For example, in the diagram 700, the BWP 706 comprises 32 RBs, and the separation of adjacent allocated L_i RBs is half the BWP. With reference to diagram 700, the RBs 0 and 1 in the VRB domain 702 are mapped to 0 and 1 in the PRB domain 704, while the RBs 2 and 3 in the VRB domain 702 are mapped to 16 and 17 in the PRB domain 704. The separation between RBs 0, 1 and RBs 2, 3 is half the BWP 706, which is 16.

As discussed herein, subband FD slots may comprise both DL and UL separated by a guard band. However, due to the different frequency allocation, part of the BWP may overlap with a corresponding subband. For example, a DL subband may be only in a lower half of the band while the DL BWP may span the entire band. In addition, VRB-to-PRB mapping is defined on a per BWP basis which may result in an allocation that is outside or beyond the band. For example, in some instances, some DL RBs may be mapped to fall within the UL subband, while in some instances, some UL RBs may be mapped to fall within the DL subband. The mapping of RBs in conflicting subbands may negatively impact communications.

Aspects presented herein provide a configuration for VRB-to-PRB interleaving based on the available subband. The VRB-to-PRB interleaving may allow for separation to be present, while also taking into account the available subband for communication to ensure that RBs are not mapped into conflicting or opposing subbands. At least one advantage of the disclosure is that the mapping of RBs may take into account a conflicting subband and map the RBs into corresponding subband. For example, DL RBs may be mapped into one or more DL subbands, such that no DL RBs are mapped to overlap with a UL subband. In another example, UL RBs may be mapped into one or more UL subbands, such that no UL RBs are mapped to overlap with a DL subband. The disclosure allows for RBs to be mapped into corresponding one or more subbands, allowing for separation, and to account for conflicting or opposing subbands.

Figure 8:
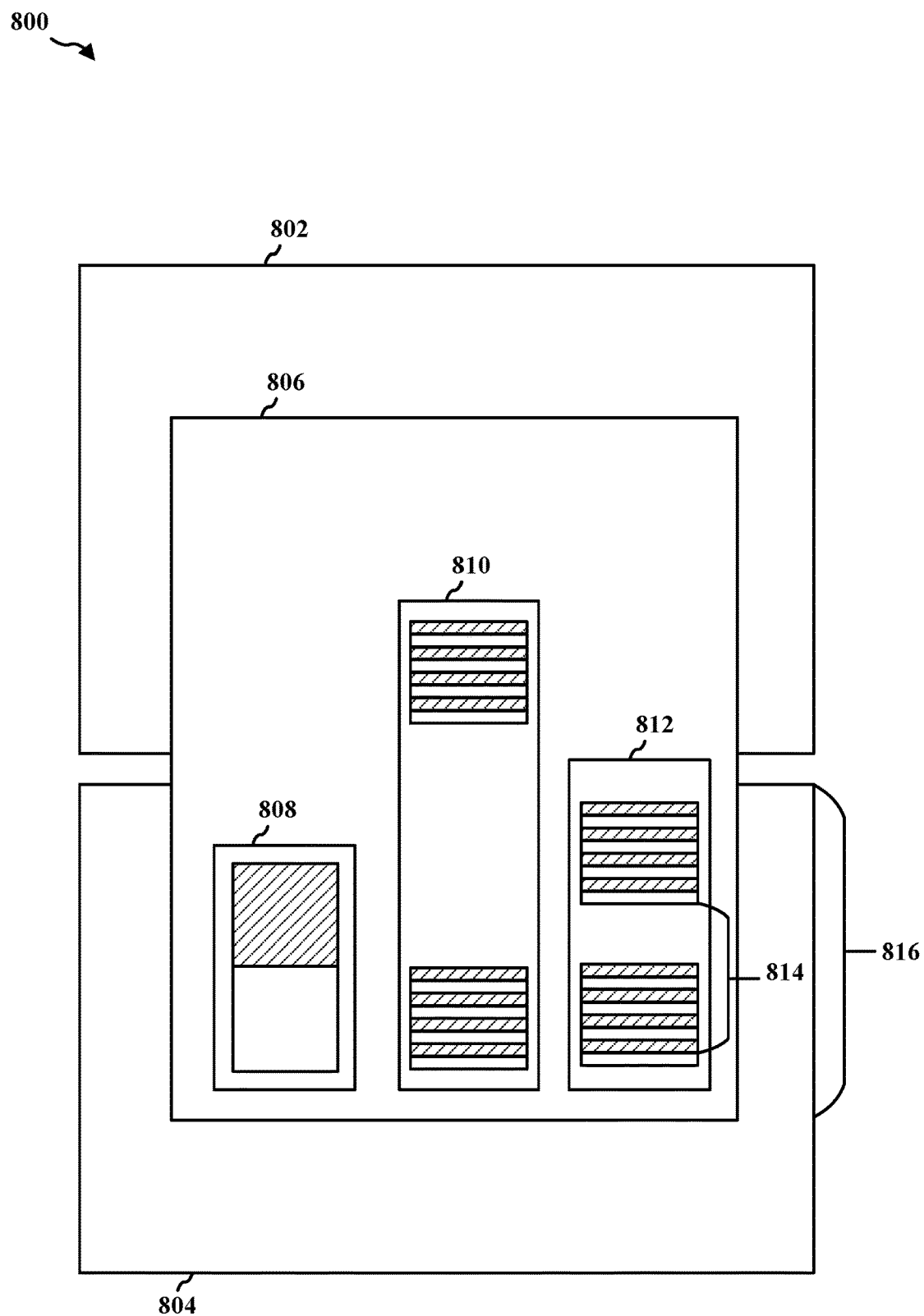
FIG. 8 is a diagram illustrating an example of slot specific interleaving.

FIG. 8 is a diagram illustrating an example of slot specific interleaving. The diagram 800 includes a UL subband 802, a DL subband 804, a DL BWP 806, and an FDRA 808. In the diagram 800, the DL BWP 806 spans beyond the DL subband 804. In conventional interleaving (e.g., 810), the RBs may be interleaved such that some of the RBs are mapped to overlap with the UL subband 802, which may lead to failure in the transmission and/or reception. The separation of RBs in conventional interleaving (e.g., 810) is based on half of the DL BWP 806, which results in some of the RBs being mapped to overlap with the UL subband 802.

In instances where VRB-to-PRB mapping is enabled, the interleaving (e.g., 812) of RBs may be configured to be based on the overlap 816 between the DL BWP 806 and the DL subband 804. In instances where the DL BWP 806 has a starting position in the DL subband 804 and has an end position in the UL subband 802, the first RB of the BWP may be the first RB in the interleaving process. However, every consecutive L_i RBs may be separated by half the available RBs 814 in the overlap 816 between the DL BWP 806 and the DL subband 804. FIG. 8 provides an example of interleaving RBs for DL transmissions, but the disclosure is not intended to be limited to the aspects provided herein. In some aspects, the RBs may be interleaved for UL transmissions, and the disclosure is not intended to be limited to DL transmissions.

Figure 9:
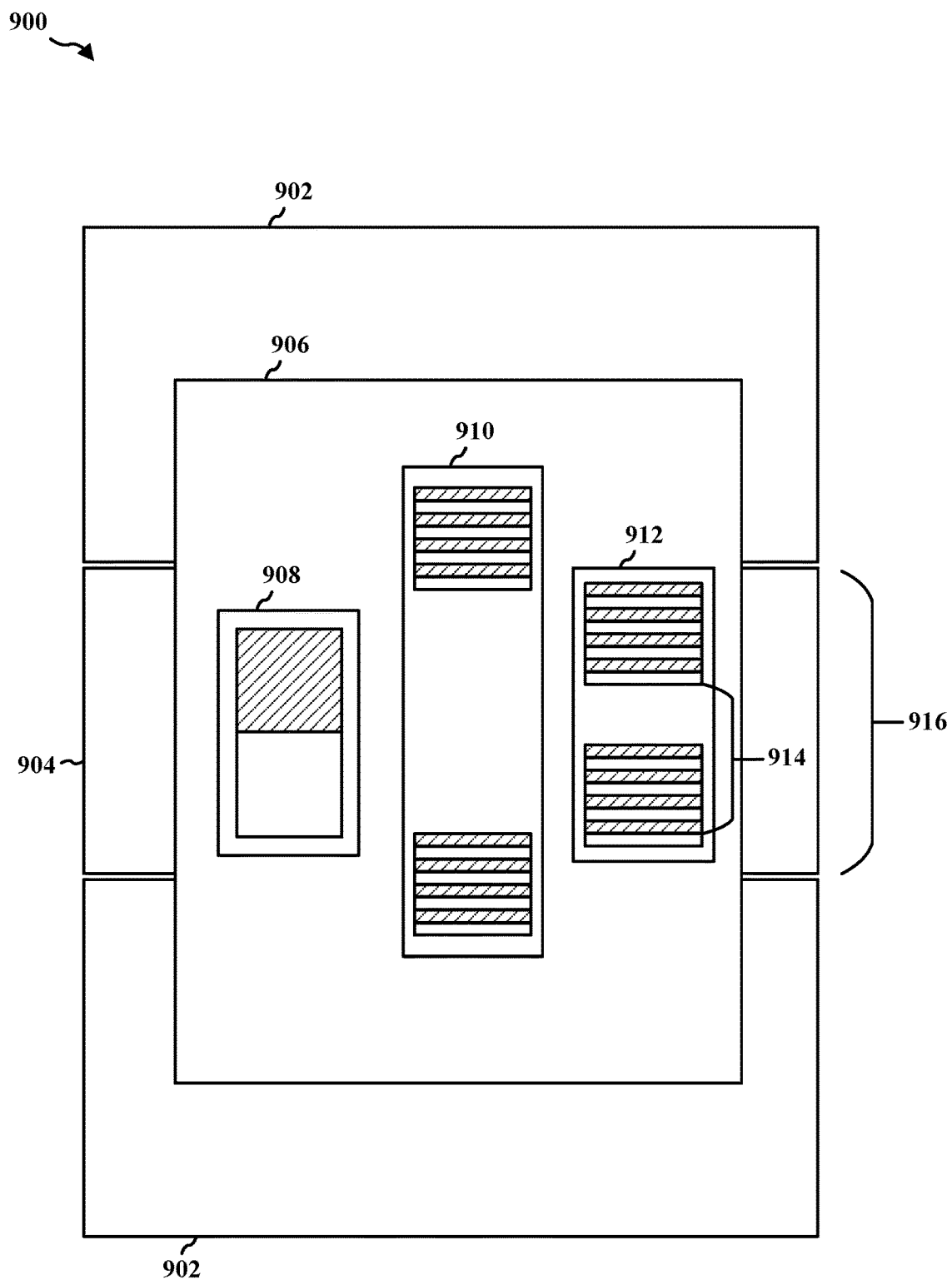
FIG. 9 is a diagram illustrating an example of slot specific interleaving.

FIG. 9 is a diagram illustrating an example of slot specific interleaving. The diagram 900 provides an example where multiple UL subbands are present. For example, the diagram 900 comprises two UL subbands 902, 902, a DL subband 904, a DL BWP 906, and FDRA 908. In the diagram 900, the DL BWP 906 spans beyond the DL BWP 906 and into both UL subbands 902, 902. In conventional interleaving (e.g., 910), the RBs may be interleaved such that some of the RBs are mapped to overlap with both of the UL subbands 902, which may lead to failure in the transmission and/or reception.

In instances where VRB-to-PRB mapping is enable, the interleaving (e.g., 912) of RBs may be configured to be based on the overlap 916 between the DL BWP 906 and the DL subband 904. In the diagram 900, the DL BWP 906 has a starting position in the lower UL subband 902 and has an end position in the upper UL subband 902. Every consecutive $L\_i$ RBs may be separated by half the available RBs 914 in the overlap 916 between the DL BWP 906 and the DL subband 904.

Figure 10:
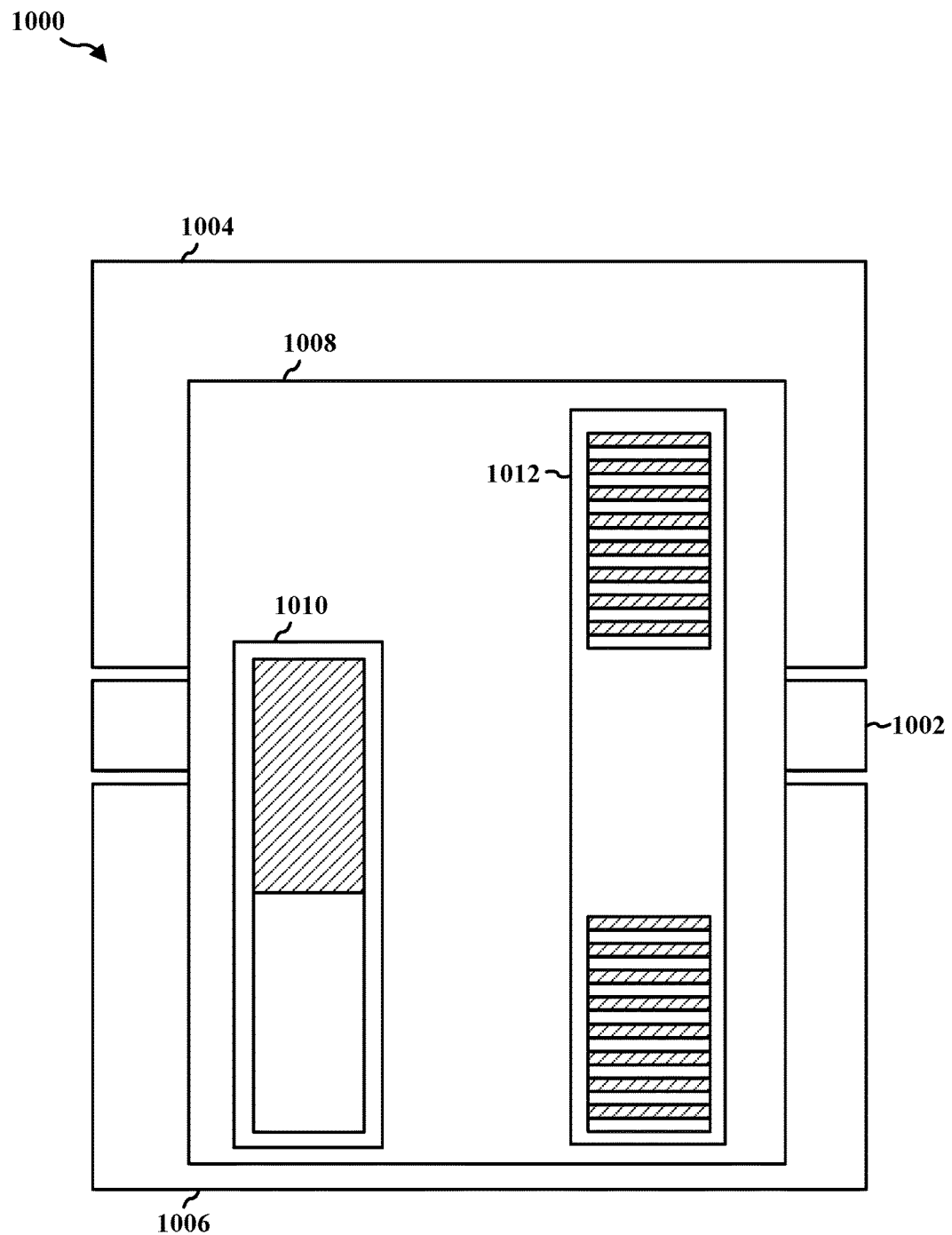
FIG. 10 is a diagram illustrating an example of slot specific interleaving.

FIG. 10 is a diagram illustrating an example of slot specific interleaving. The diagram 1000 includes a UL subband 1002, a plurality of DL subbands, for example, a first DL subband 1004 and a second DL subband 1006, a DL BWP 1008, and FDRA 1010. In the diagram 1000, the DL BWP 1008 completely overlaps the UL subband 1002, while having a start position in the second DL subband 1006, and an end position in the first DL subband 1004. The interleaving 1012 of RBs may be mapped such that the separation of RBs may be based on half of the DL BWP 1008, provided that after the mapping, the RBs are located within a corresponding DL subband (e.g., 1004, 1006) with minimal to no overlap within the UL subband 1002. However, if the interleaving of RBs having a separation of RBs based on half of the DL BWP 1008 results in RBs overlapping the UL subband 1002, then the interleaving of RBs may be mapped to have a separation based on overlap between the DL BWP 1008 and the first DL subband 1004 and the second DL subband 1006.

Figure 11:
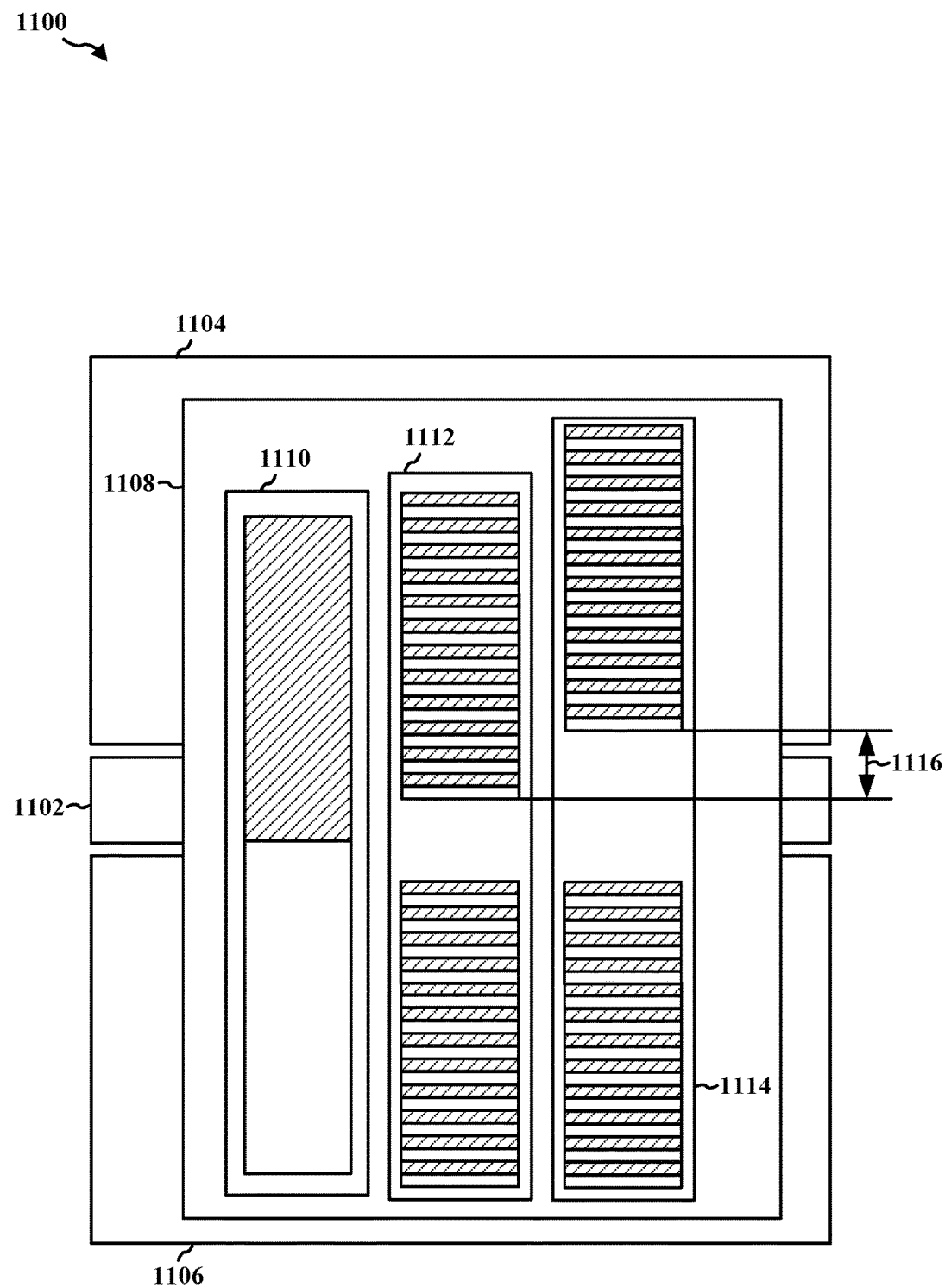
FIG. 11 is a diagram illustrating an example of slot specific interleaving.

FIG. 11 is a diagram illustrating an example of slot specific interleaving. The diagram 1100 includes a UL subband 1102, a plurality of DL subbands, for example, a first DL subband 1104 and a second DL subband 1106, a DL BWP 1108, and FDRA 1110. In the diagram 1100, the DL BWP 1108 completely overlaps the UL subband 1102, while having a start position in the second DL subband 1106, and an end position in the first DL subband 1104. In instances of more than one subband (e.g., a plurality of DL subbands), conventional interleaving (e.g., 1112) may result in an overlap of RBs within the UL subband 1102, where the overlap of RBs within UL subband 1102 exceeds a threshold. In such instances, a UE may be configured to apply a shift to the separation between every $L\_i$ consecutive RBs. For example, the interleaving (e.g., 1114) of RBs may be configured such that every $L\_i$ consecutive RBs are offset. The applied offset may position the second half of RBs to have a start position at a start of the first DL subband 1104, such that the second half of RBs do not overlap with the UL subband 1102. The applied offset may be RRC configured or may be selected by the UE, such that the second half of the RBs are within the first DL subband 1104. In some aspects, the separation between $L\_i$ consecutive RBs may be based on half of the DL BWP 1108 plus an offset 1116, to ensure that RBs do not overlap the UL subband 1102.

In some aspects, the separation between every $L\_i$ consecutive RBs may be slot dependent. For example, the separation between every $L\_i$ consecutive RBs may be half the BWP for half duplex slots, while the separation between every $L\_i$ consecutive RBs may be half the overlap between the BWP and the corresponding subband for FD slots. In some aspects, the separation between every $L\_i$ consecutive RBs may be half of the BWP for half duplex slots and FD slots if the interleaving does not result in RB overlapping a conflicting or opposite subband. In some aspects, the separation between every $L\_i$ consecutive RBs may be half of the BWP for half duplex slots and FD slots as long as the allocated RBs that overlap the conflicting or opposing subband do not exceed a threshold. In some aspects, the separation between every $L\_i$ consecutive RBs may be configured separately for each BWP for FD slots based on the number of RBS. In some aspects, the separation between every $L\_i$ consecutive RBs may be dynamically indicated based on the number of RBs.

Figure 12:
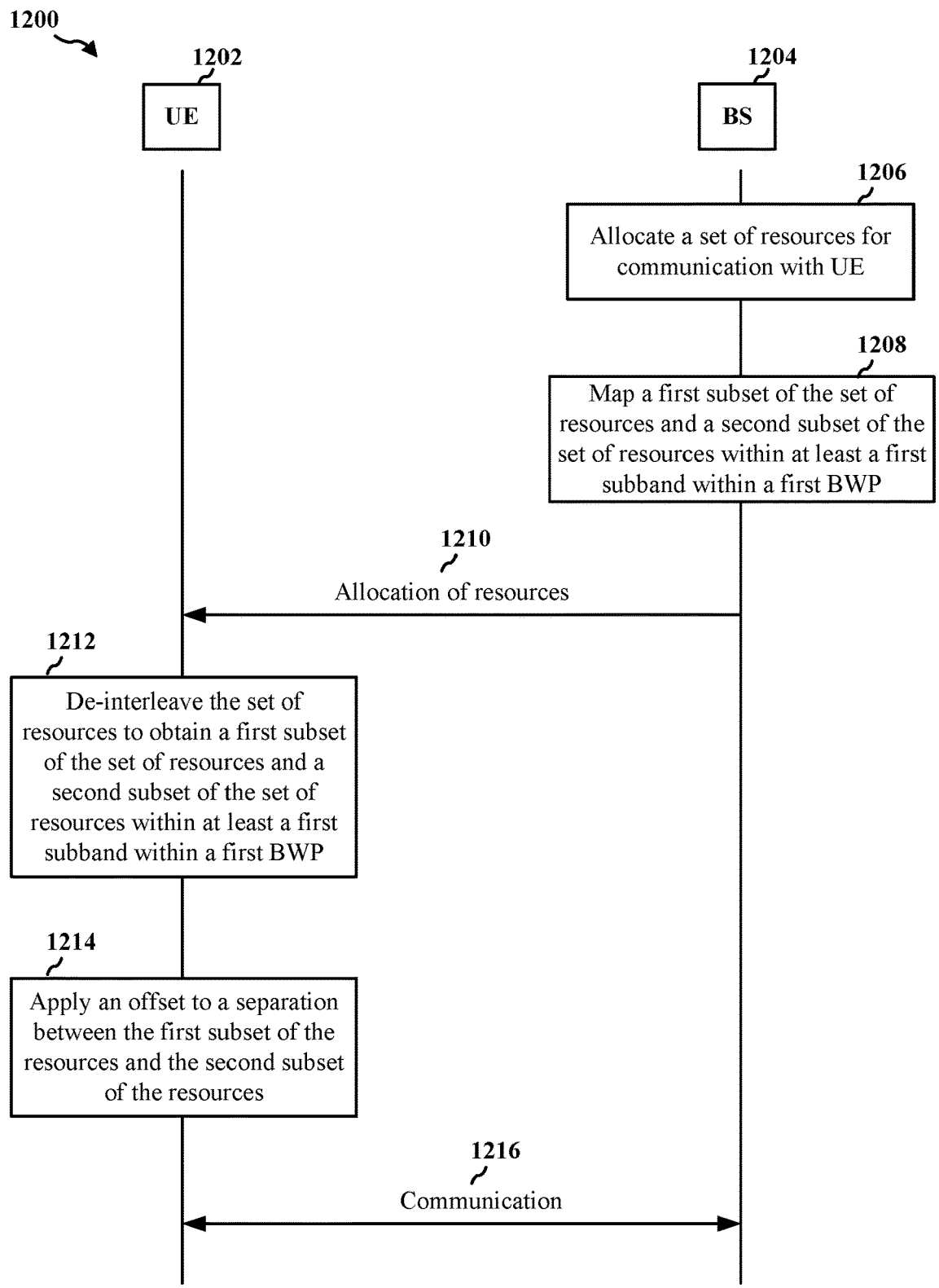
FIG. 12 is a call flow diagram of signaling between a base station and a UE.

FIG. 12 is a call flow diagram 1200 of signaling between a UE 1202 and a base station 1204. The base station 1204 may be configured to provide at least one cell. The UE 1202 may be configured to communicate with the base station 1204. For example, in the context of FIG. 1, the base station 1204 may correspond to base station 102 and. Further, a UE 1202 may correspond to at least UE 104. In another example, in the context of FIG. 3, the base station 1204 may correspond to base station 310 and the UE 1202 may correspond to UE 350.

At 1206, the base station 1204 may allocate a set of resources for communication with the UE 1202. The set of resources may comprise a plurality of RB s. The plurality of RBs may be allocated for communication between the UE 1202 and the base station 1204. For example, At 1208, the base station 1204 may map a first subset of the set of resources and a second subset of the set of resources within at least a first subband within a first BWP. The first subset and the second subset may be interleaved within the first subband based at least on an overlap between the first BWP and at least the first subband. In some aspects, a first RB of the first BWP may correspond to a first RB of the first subset in response to the first BWP having a starting position within the first subband and having an ending position within a second subband. The first subband and the second subband may be different. In some aspects, consecutive RBs of the first subset and the second subset may be separated based on an available amount of RBs in the overlap between the first BWP and at least the first subband. For example, the consecutive RBs of the first subset and the second subset may be separated based on half of the available amount of RB s in the overlap between the first BWP and at least the first subband. In some aspects, the first BWP may overlap a plurality of second subbands and the first subband. The first BWP may have a starting position within one of the plurality of second subbands, completely overlaps the first subband, and may have an ending position within a different subband of the plurality of second subbands. In such instances, the first subset and the second subset may be within the first subband. In some aspects, the first BWP may overlap a plurality of first subbands and at least a second subband. The first BWP may have a starting position within one of the plurality of first subbands, completely overlaps the second subband, and may have an ending position within a different subband of the plurality of first subbands. For example, the first subset may be within the one of the plurality of first subbands and the second subset may be within the different subband of the plurality of first subbands. In some instances, an offset may be applied to a separation between the first subset of resources and the second subset of resources. In such instances, the second subset of resources may have a starting position within the different subband of the plurality of first subbands. The offset may be applied to each consecutive RB s of the first subset and the second subset. The offset may be configured via RRC signaling. In some aspects, consecutive RBs of the first subset and the second subset may be separated based on half of an available amount of RBs in the overlap between the first BWP and at least the first subband for full duplex slots. In some aspects, consecutive RBs of the first subset and the second subset may be separated based on half of the first BWP when the first and second subsets are within the first subband. In some aspects, consecutive RBs of the first subset and the second subset may be separated based on half of the first BWP when an amount of RBs within the first or second subsets that overlap a second subband is within a threshold. In some aspects, a separation of consecutive RBs of the first subset and the second subset may be configured separately for each BWP for full duplex slots based on an amount of RBs. In some aspects, a separation of consecutive RBs of the first subset and the second subset may be dynamically indicated based on an amount of RBs. The mapping of the resources may be based on any of the aspects described in connection with FIGS. 8-11.

At 1210, the UE 1202 may receive an allocation of a set of resources for communication with the base station 1204. The UE 1202 may receive the allocation of the set of resources from the base station 1204. The set of resources may comprise a plurality of RB s. The plurality of RB s may be allocated for communication between the UE and the base station.

At 1212, UE 1202 may de-interleave the set of resources to obtain a first subset of the set of resources and a second subset of the set of resources within at least a first subband within a first BWP. The first subset and the second subset may be interleaved within the first subband based at least on an overlap between the first BWP and at least the first subband. In some aspects, a first RB of the first BWP may correspond to a first RB of the first subset in response to the first BWP having a starting position within the first subband and having an ending position within a second subband. The first subband and the second subband may be different. In some aspects, consecutive RBs of the first subset and the second subset may be separated based on an available amount of RBs in the overlap between the first BWP and at least the first subband. For example, the consecutive RBs of the first subset and the second subset may be separated based on half of the available amount of RBs in the overlap between the first BWP and at least the first subband. In some aspects, the first BWP may overlap a plurality of second subbands and the first subband. The first BWP may have a starting position within one of the plurality of second subbands, completely overlaps the first subband, and may have an ending position within a different subband of the plurality of second subbands. In such instances, the first subset and the second subset may be within the first subband. In some aspects, the first BWP may overlap a plurality of first subbands and at least a second subband. The first BWP may have a starting position within one of the plurality of first subbands, completely overlaps the second subband, and may have an ending position within a different subband of the plurality of first subbands. For example, the first subset may be within the one of the plurality of first subbands and the second subset may be within the different subband of the plurality of first subbands. In some aspects, consecutive RBs of the first subset and the second subset may be separated based on half of an available amount of RBs in the overlap between the first BWP and at least the first subband for full duplex slots. In some aspects, consecutive RBs of the first subset and the second subset may be separated based on half of the first BWP when the first and second subsets are within the first subband. In some aspects, consecutive RBs of the first subset and the second subset may be separated based on half of the first BWP when an amount of RBs within the first or second subsets that overlap a second subband is within a threshold. In some aspects, a separation of consecutive RBs of the first subset and the second subset may be configured separately for each BWP for full duplex slots based on an amount of RBs. In some aspects, a separation of consecutive RBs of the first subset and the second subset may be dynamically indicated based on an amount of RBs. The de-interleaving of the resources may be based on any of the aspects described in connection with FIGS. 8-11.

At 1214, the UE 1202 may apply an offset to a separation between the first subset of resources and the second subset of resources. The second subset of resources may have a starting position within the different subband of the plurality of first subbands. In some aspects, the offset may be applied to each consecutive RBs of the first subset and the second subset. In some aspects, the offset may be configured via RRC signaling. The application of the offset may be based on any of the aspects described in connection with FIG. 11.

At 1216, the UE 1202 may communicate with the base station 1204 based at least on the first subset of the set of resources or the second subset of the set of resources.

Figure 13:
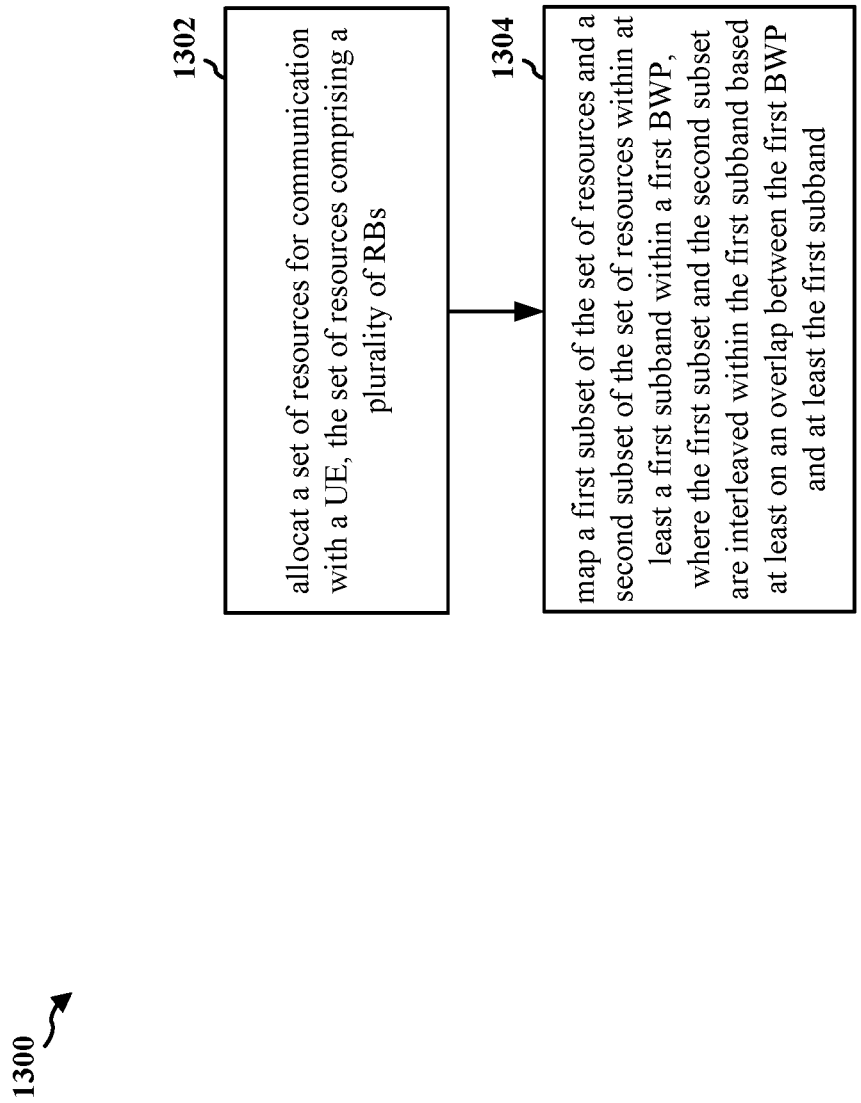
FIG. 13 is a flowchart of a method of wireless communication.

FIG. 13 is a flowchart 1300 of a method of wireless communication. The method may be performed by a base station (e.g., the base station 102; the network entity 1402. One or more of the illustrated operations may be omitted, transposed, or contemporaneous. The method may allow for RBs to be mapped based on an overlap of an available subband and a corresponding BWP.

At 1302, the network entity may allocate a set of resources for communication with a UE. For example, 1302 may be performed by map component 199 of network entity 1402. The set of resources may comprise a plurality of RBs. The plurality of RBs may be allocated for communication between the UE and the network entity.

At 1304, the network entity may map a first subset of the set of resources and a second subset of the set of resources within at least a first subband within a first BWP. For example, 1304 may be performed by map component 199 of network entity 1402. The first subset and the second subset may be interleaved within the first subband based at least on an overlap between the first BWP and at least the first subband. In some aspects, a first RB of the first BWP may correspond to a first RB of the first subset in response to the first BWP having a starting position within the first subband and having an ending position within a second subband. The first subband and the second subband may be different. In some aspects, consecutive RBs of the first subset and the second subset may be separated based on an available amount of RBs in the overlap between the first BWP and at least the first subband. For example, the consecutive RBs of the first subset and the second subset may be separated based on half of the available amount of RBs in the overlap between the first BWP and at least the first subband. In some aspects, the first BWP may overlap a plurality of second subbands and the first subband. The first BWP may have a starting position within one of the plurality of second subbands, completely overlaps the first subband, and may have an ending position within a different subband of the plurality of second subbands. In such instances, the first subset and the second subset may be within the first subband. In some aspects, the first BWP may overlap a plurality of first subbands and at least a second subband. The first BWP may have a starting position within one of the plurality of first subbands, completely overlaps the second subband, and may have an ending position within a different subband of the plurality of first subbands. For example, the first subset may be within the one of the plurality of first subbands and the second subset may be within the different subband of the plurality of first subbands. In some instances, an offset may be applied to a separation between the first subset of resources and the second subset of resources. In such instances, the second subset of resources may have a starting position within the different subband of the plurality of first subbands. The offset may be applied to each consecutive RBs of the first subset and the second subset. The offset may be configured via RRC signaling. In some aspects, consecutive RBs of the first subset and the second subset may be separated based on half of an available amount of RBs in the overlap between the first BWP and at least the first subband for full duplex slots. In some aspects, consecutive RBs of the first subset and the second subset may be separated based on half of the first BWP when the first and second subsets are within the first subband. In some aspects, consecutive RBs of the first subset and the second subset may be separated based on half of the first BWP when an amount of RBs within the first or second subsets that overlap a second subband is within a threshold. In some aspects, a separation of consecutive RBs of the first subset and the second subset may be configured separately for each BWP for full duplex slots based on an amount of RBs. In some aspects, a separation of consecutive RBs of the first subset and the second subset may be dynamically indicated based on an amount of RBs. The mapping of the resources may be based on any of the aspects described in connection with FIGS. 8-11.

Figure 14:
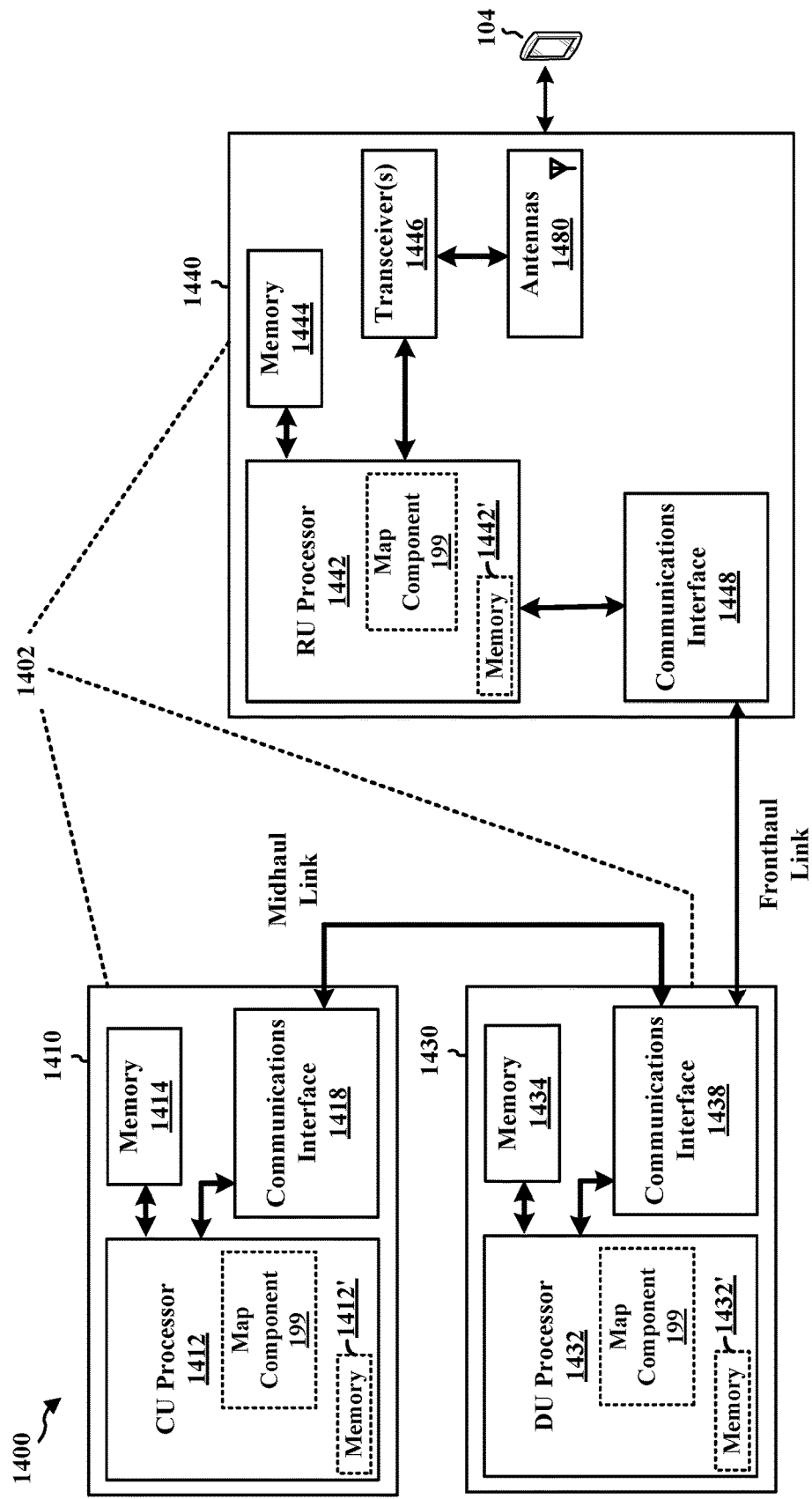
FIG. 14 is a diagram illustrating an example of a hardware implementation for an example network entity.

FIG. 14 is a diagram 1400 illustrating an example of a hardware implementation for a network entity 1402. The network entity 1402 may be a BS, a component of a BS, or may implement BS functionality. The network entity 1402 may include at least one of a CU 1410, a DU 1430, or an RU 1440. For example, depending on the layer functionality handled by the component 199, the network entity 1402 may include the CU 1410; both the CU 1410 and the DU 1430; each of the CU 1410, the DU 1430, and the RU 1440; the DU 1430; both the DU 1430 and the RU 1440; or the RU 1440. The CU 1410 may include a CU processor 1412. The CU processor 1412 may include on-chip memory 1412'. In some aspects, the CU 1410 may further include additional memory modules 1414 and a communications interface 1418. The CU 1410 communicates with the DU 1430 through a midhaul link, such as an F1 interface. The DU 1430 may include a DU processor 1432. The DU processor 1432 may include on-chip memory 1432'. In some aspects, the DU 1430 may further include additional memory modules 1434 and a communications interface 1438. The DU 1430 communicates with the RU 1440 through a fronthaul link. The RU 1440 may include an RU processor 1442. The RU processor 1442 may include on-chip memory 1442'. In some aspects, the RU 1440 may further include additional memory modules 1444, one or more transceivers 1446, antennas 1480, and a communications interface 1448. The RU 1440 communicates with the UE 104. The on-chip memory 1412',1432',1442' and the additional memory modules 1414, 1434, 1444 may each be considered a computer-readable medium/memory. Each computer-readable medium/memory may be non-transitory. Each of the processors 1412, 1432, 1442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to allocate a set of resources for communication with a UE, the set of resources comprising a plurality of RBs; and map a first subset of the set of resources and a second subset of the set of resources within at least a first subband within a first BWP, wherein the first subset and the second subset are interleaved within the first subband based at least on an overlap between the first BWP and at least the first subband. The component 199 may be within one or more processors of one or more of the CU 1410, DU 1430, and the RU 1440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1402 may include a variety of components configured for various functions. In one configuration, the network entity 1402 includes means for allocating a set of resources for communication with a UE. The set of resources comprising a plurality of RBs. The network entity includes means for mapping a first subset of the set of resources and a second subset of the set of resources within at least a first subband within a first BWP. The first subset and the second subset are interleaved within the first subband based at least on an overlap between the first BWP and at least the first subband. The means may be the component 199 of the network entity 1402 configured to perform the functions recited by the means. As described supra, the network entity 1402 may include the TX processor 316, the RX processor 370, and the controller/processor 375. As such, in one configuration, the means may be the TX processor 316, the RX processor 370, and/or the controller/processor 375 configured to perform the functions recited by the means.

Figure 15:
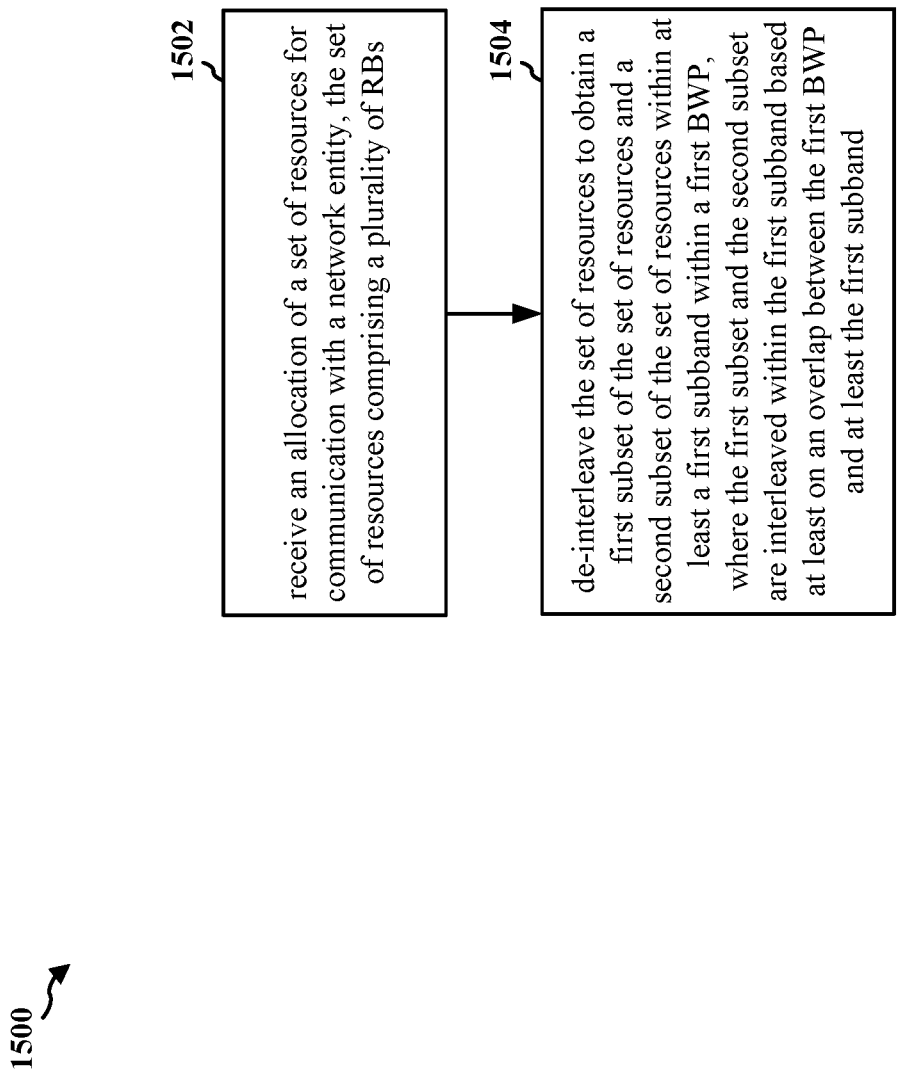
FIG. 15 is a flowchart of a method of wireless communication.

FIG. 15 is a flowchart 1500 of a method of wireless communication. The method may be performed by a UE (e.g., the UE 104; the apparatus 1704). One or more of the illustrated operations may be omitted, transposed, or contemporaneous. The method may allow for RBs to be mapped based on an overlap of an available subband and a corresponding BWP.

At 1502, the UE may receive an allocation of a set of resources for communication with a network entity. For example, 1502 may be performed by resource component 198 of apparatus 1704. The set of resources may comprise a plurality of RBs. The plurality of RBs may be allocated for communication between the UE and the network entity.

At 1504, the UE may de-interleave the set of resources to obtain a first subset of the set of resources and a second subset of the set of resources within at least a first subband within a first BWP. For example, 1504 may be performed by resource component 198 of apparatus 1704. The first subset and the second subset may be interleaved within the first subband based at least on an overlap between the first BWP and at least the first subband. In some aspects, a first RB of the first BWP may correspond to a first RB of the first subset in response to the first BWP having a starting position within the first subband and having an ending position within a second subband. The first subband and the second subband may be different. In some aspects, consecutive RBs of the first subset and the second subset may be separated based on an available amount of RBs in the overlap between the first BWP and at least the first subband. For example, the consecutive RBs of the first subset and the second subset may be separated based on half of the available amount of RBs in the overlap between the first BWP and at least the first subband. In some aspects, the first BWP may overlap a plurality of second subbands and the first subband. The first BWP may have a starting position within one of the plurality of second subbands, completely overlaps the first subband, and may have an ending position within a different subband of the plurality of second subbands. In such instances, the first subset and the second subset may be within the first subband. In some aspects, the first BWP may overlap a plurality of first subbands and at least a second subband. The first BWP may have a starting position within one of the plurality of first subbands, completely overlaps the second subband, and may have an ending position within a different subband of the plurality of first subbands. For example, the first subset may be within the one of the plurality of first subbands and the second subset may be within the different subband of the plurality of first subbands. In some aspects, consecutive RBs of the first subset and the second subset may be separated based on half of an available amount of RBs in the overlap between the first BWP and at least the first subband for full duplex slots. In some aspects, consecutive RBs of the first subset and the second subset may be separated based on half of the first BWP when the first and second subsets are within the first subband. In some aspects, consecutive RBs of the first subset and the second subset may be separated based on half of the first BWP when an amount of RBs within the first or second subsets that overlap a second subband is within a threshold. In some aspects, a separation of consecutive RBs of the first subset and the second subset may be configured separately for each BWP for full duplex slots based on an amount of RBs. In some aspects, a separation of consecutive RBs of the first subset and the second subset may be dynamically indicated based on an amount of RBs. The de-interleaving of the resources may be based on any of the aspects described in connection with FIGS. 8-11.

Figure 16:
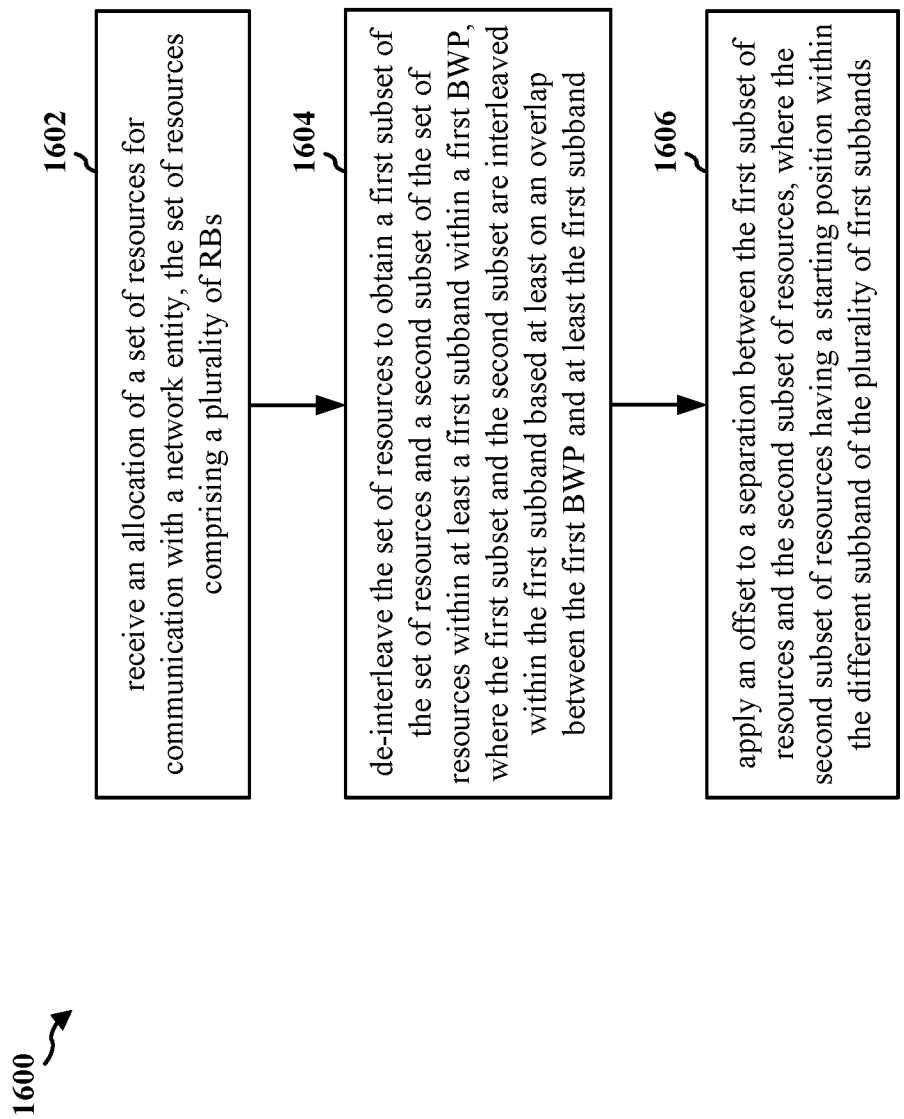
FIG. 16 is a flowchart of a method of wireless communication.

FIG. 16 is a flowchart 1600 of a method of wireless communication. The method may be performed by a UE (e.g., the UE 104; the apparatus 1704). One or more of the illustrated operations may be omitted, transposed, or contemporaneous. The method may allow for RBs to be mapped based on an overlap of an available subband and a corresponding BWP.

At 1602, the UE may receive an allocation of a set of resources for communication with a network entity. For example, 1602 may be performed by resource component 198 of apparatus 1704. The set of resources may comprise a plurality of RBs. The plurality of RBs may be allocated for communication between the UE and the network entity.

At 1604, the UE may de-interleave the set of resources to obtain a first subset of the set of resources and a second subset of the set of resources within at least a first subband within a first BWP. For example, 1604 may be performed by resource component 198 of apparatus 1704. The first subset and the second subset may be interleaved within the first subband based at least on an overlap between the first BWP and at least the first subband. In some aspects, a first RB of the first BWP may correspond to a first RB of the first subset in response to the first BWP having a starting position within the first subband and having an ending position within a second subband. The first subband and the second subband may be different. In some aspects, consecutive RBs of the first subset and the second subset may be separated based on an available amount of RBs in the overlap between the first BWP and at least the first subband. For example, the consecutive RBs of the first subset and the second subset may be separated based on half of the available amount of RBs in the overlap between the first BWP and at least the first subband. In some aspects, the first BWP may overlap a plurality of second subbands and the first subband. The first BWP may have a starting position within one of the plurality of second subbands, completely overlaps the first subband, and may have an ending position within a different subband of the plurality of second subbands. In such instances, the first subset and the second subset may be within the first subband. In some aspects, the first BWP may overlap a plurality of first subbands and at least a second subband. The first BWP may have a starting position within one of the plurality of first subbands, completely overlaps the second subband, and may have an ending position within a different subband of the plurality of first subbands. For example, the first subset may be within the one of the plurality of first subbands and the second subset may be within the different subband of the plurality of first subbands. In some aspects, consecutive RBs of the first subset and the second subset may be separated based on half of an available amount of RBs in the overlap between the first BWP and at least the first subband for full duplex slots. In some aspects, consecutive RBs of the first subset and the second subset may be separated based on half of the first BWP when the first and second subsets are within the first subband. In some aspects, consecutive RBs of the first subset and the second subset may be separated based on half of the first BWP when an amount of RBs within the first or second subsets that overlap a second subband is within a threshold. In some aspects, a separation of consecutive RBs of the first subset and the second subset may be configured separately for each BWP for full duplex slots based on an amount of RBs. In some aspects, a separation of consecutive RBs of the first subset and the second subset may be dynamically indicated based on an amount of RBs. The de-interleaving of the resources may be based on any of the aspects described in connection with FIGS. 8-11.

At 1606, the UE may apply an offset to a separation between the first subset of resources and the second subset of resources. For example, 1606 may be performed by resource component 198 of apparatus 1704. The second subset of resources may have a starting position within the different subband of the plurality of first subbands. In some aspects, the offset may be applied to each consecutive RBs of the first subset and the second subset. In some aspects, the offset may be configured via RRC signaling. The application of the offset may be based on any of the aspects described in connection with FIG. 11.

FIG. 17 is a diagram 1700 illustrating an example of a hardware implementation for an apparatus 1704. The apparatus 1704 may be a UE, a component of a UE, or may implement UE functionality. In some aspects, the apparatus 1704 may include a cellular baseband processor 1724 (also referred to as a modem) coupled to one or more transceivers 1722 (e.g., cellular RF transceiver). The cellular baseband processor 1724 may include on-chip memory 1724'. In some aspects, the apparatus 1704 may further include one or more subscriber identity modules (SIM) cards 1720 and an application processor 1706 coupled to a secure digital (SD) card 1708 and a screen 1710. The application processor 1706 may include on-chip memory 1706'. In some aspects, the apparatus 1704 may further include a Bluetooth module 1712, a WLAN module 1714, an SPS module 1716 (e.g., GNSS module), one or more sensor modules 1718 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1726, a power supply 1730, and/or a camera 1732. The Bluetooth module 1712, the WLAN module 1714, and the SPS module 1716 may include an on-chip transceiver (TRX) (or in some cases, just a receiver (RX)). The Bluetooth module 1712, the WLAN module 1714, and the SPS module 1716 may include their own dedicated antennas and/or utilize the antennas 1780 for communication. The cellular baseband processor 1724 communicates through the transceiver(s) 1722 via one or more antennas 1780 with the UE 104 and/or with an RU associated with a network entity 1702. The cellular baseband processor 1724 and the application processor 1706 may each include a computer-readable medium/memory 1724', 1706', respectively. The additional memory modules 1726 may also be considered a computer-readable medium/memory. Each computer-readable medium/memory 1724', 1706', 1726 may be non-transitory. The cellular baseband processor 1724 and the application processor 1706 are each responsible for general processing, including the execution of software stored on the computer-readable medium/memory. The software, when executed by the cellular baseband processor 1724/application processor 1706, causes the cellular baseband processor 1724/application processor 1706 to perform the various functions described supra. The computer-readable medium/memory may also be used for storing data that is manipulated by the cellular baseband processor 1724/application processor 1706 when executing software. The cellular baseband processor 1724/application processor 1706 may be a component of the UE 350 and may include the memory 360 and/or at least one of the TX processor 368, the RX processor 356, and the controller/processor 359. In one configuration, the apparatus 1704 may be a processor chip (modem and/or application) and include just the cellular baseband processor 1724 and/or the application processor 1706, and in another configuration, the apparatus 1704 may be the entire UE (e.g., see 350 of FIG. 3) and include the additional modules of the apparatus 1704.

As discussed supra, the component 198 is configured to receive an allocation of a set of resources for communication with a network entity, the set of resources comprising a plurality of RBs; and de-interleave the set of resources to obtain a first subset of the set of resources and a second subset of the set of resources within at least a first subband within a first BWP, wherein the first subset and the second subset are interleaved within the first subband based at least on an overlap between the first BWP and at least the first subband. The component 198 may be within the cellular baseband processor 1724, the application processor 1706, or both the cellular baseband processor 1724 and the application processor 1706. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1704 may include a variety of components configured for various functions. In one configuration, the apparatus 1704, and in particular the cellular baseband processor 1724 and/or the application processor 1706, includes means for receiving an allocation of a set of resources for communication with a network entity, the set of resources comprising a plurality of RBs. The apparatus includes means for de-interleaving the set of resources to obtain a first subset of the set of resources and a second subset of the set of resources within at least a first subband within a first BWP. The first subset and the second subset are interleaved within the first subband based at least on an overlap between the first BWP and at least the first subband. The apparatus further includes means for applying an offset to a separation between the first subset of resources and the second subset of resources. The second subset of resources having a starting position within the different subband of the plurality of first subbands. The means may be the component 198 of the apparatus 1704 configured to perform the functions recited by the means. As described supra, the apparatus 1704 may include the TX processor 368, the RX processor 356, and the controller/processor 359. As such, in one configuration, the means may be the TX processor 368, the RX processor 356, and/or the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, comprising allocating a set of resources for communication with a UE, the set of resources comprising a plurality of RBs; and mapping a first subset of the set of resources and a second subset of the set of resources within at least a first subband within a first BWP, wherein the first subset and the second subset are interleaved within the first subband based at least on an overlap between the first BWP and at least the first subband.

Aspect 2 is the method of aspect 1, further includes that a first RB of the first BWP corresponds to a first RB of the first subset in response to the first BWP having a starting position within the first subband and having an ending position within a second subband, wherein the first subband and the second subband are different.

Aspect 3 is the method of any of aspects 1 and 2, further includes that consecutive RBs of the first subset and the second subset are separated based on an available amount of RBs in the overlap between the first BWP and at least the first subband.

Aspect 4 is the method of any of aspects 1-3, further includes that the consecutive RBs of the first subset and the second subset are separated based on half of the available amount of RBs in the overlap between the first BWP and at least the first subband.

Aspect 5 is the method of any of aspects 1-4, further includes that the first BWP overlaps a plurality of second subbands and the first subband, wherein the first BWP having a starting position within one of the plurality of second subbands, completely overlaps the first subband, and having an ending position within a different subband of the plurality of second subbands.

Aspect 6 is the method of any of aspects 1-5, further includes that the first subset and the second subset are within the first subband.

Aspect 7 is the method of any of aspects 1-6, further includes that the first BWP overlaps a plurality of first subbands and at least a second subband, wherein the first BWP having a starting position within one of the plurality of first subbands, completely overlaps the second subband, and having an ending position within a different subband of the plurality of first subbands.

Aspect 8 is the method of any of aspects 1-7, further includes that the first subset is within the one of the plurality of first subbands and the second subset is within the different subband of the plurality of first subbands.

Aspect 9 is the method of any of aspects 1-8, further includes that an offset is applied to a separation between the first subset of resources and the second subset of resources, wherein the second subset of resources having a starting position within the different subband of the plurality of first subbands.

Aspect 10 is the method of any of aspects 1-9, further includes that the offset is applied to each consecutive RBs of the first subset and the second subset.

Aspect 11 is the method of any of aspects 1-10, further includes that the offset is configured via RRC signaling.

Aspect 12 is the method of any of aspects 1-11, further includes that consecutive RBs of the first subset and the second subset are separated based on at least one of half of an available amount of RBs in the overlap between the first BWP and at least the first subband for full duplex slots, half of the first BWP when the first and second subsets are within the first subband, half of the first BWP when an amount of RBs within the first or second subsets that overlap a second subband is within a threshold, a separate configuration for each BWP for full duplex slots based on an amount of RBs, or a dynamic indication based on the amount of RBs.

Aspect 13 is an apparatus for wireless communication at a network entity including at least one processor coupled to a memory and at least one transceiver, the at least one processor configured to implement any of Aspects 1-12.

Aspect 14 is an apparatus for wireless communication at a network entity including means for implementing any of Aspects 1-12.

Aspect 15 is a computer-readable medium storing computer executable code, where the code when executed by a processor causes the processor to implement any of Aspects 1-12.

Aspect 16 is a method of wireless communication at a UE comprising receiving an allocation of a set of resources for communication with a network entity, the set of resources comprising a plurality of RBs; and de-interleaving the set of resources to obtain a first subset of the set of resources and a second subset of the set of resources within at least a first subband within a first BWP, wherein the first subset and the second subset are interleaved within the first subband based at least on an overlap between the first BWP and at least the first subband.

Aspect 17 is the method of aspect 16, further includes that a first RB of the first BWP corresponds to a first RB of the first subset in response to the first BWP having a starting position within the first subband and having an ending position within a second subband, wherein the first subband and the second subband are different.

Aspect 18 is the method of any of aspects 16 and 17, further includes that consecutive RBs of the first subset and the second subset are separated based on an available amount of RBs in the overlap between the first BWP and at least the first subband.

Aspect 19 is the method of any of aspects 16-18, further includes that the consecutive RBs of the first subset and the second subset are separated based on half of the available amount of RBs in the overlap between the first BWP and at least the first subband.

Aspect 20 is the method of any of aspects 16-19, further includes that the first BWP overlaps a plurality of second subbands and the first subband, wherein the first BWP having a starting position within one of the plurality of second subbands, completely overlaps the first subband, and having an ending position within a different subband of the plurality of second subbands.

Aspect 21 is the method of any of aspects 16-20, further includes that the first subset and the second subset are within the first subband.

Aspect 22 is the method of any of aspects 16-21, further includes that the first BWP overlaps a plurality of first subbands and at least a second subband, wherein the first BWP having a starting position within one of the plurality of first subbands, completely overlaps the second subband, and having an ending position within a different subband of the plurality of first subbands.

Aspect 23 is the method of any of aspects 16-22, further includes that the first subset is within the one of the plurality of first subbands and the second subset is within the different subband of the plurality of first subbands.

Aspect 24 is the method of any of aspects 16-23, further including applying an offset to a separation between the first subset of resources and the second subset of resources, wherein the second subset of resources having a starting position within the different subband of the plurality of first subbands.

Aspect 25 is the method of any of aspects 16-24, further includes that the offset is applied to each consecutive RBs of the first subset and the second subset.

Aspect 26 is the method of any of aspects 16-25, further includes that the offset is configured via RRC signaling.

Aspect 27 is the method of any of aspects 16-26, further includes that consecutive RBs of the first subset and the second subset are separated based on at least one of half of an available amount of RBs in the overlap between the first BWP and at least the first subband for full duplex slots, half of the first BWP when the first and second subsets are within the first subband, half of the first BWP when an amount of RBs within the first or second subsets that overlap a second subband is within a threshold, a separate configuration for each BWP for full duplex slots based on an amount of RBs, or a dynamic indication based on the amount of RBs.

Aspect 28 is an apparatus for wireless communication at a UE including at least one processor coupled to a memory and at least one transceiver, the at least one processor configured to implement any of Aspects 16-27.

Aspect 29 is an apparatus for wireless communication at a UE including means for implementing any of Aspects 16-27.

Aspect 30 is a computer-readable medium storing computer executable code, where the code when executed by a processor causes the processor to implement any of Aspects 16-27.

What is claimed is:

1. An apparatus for wireless communication at a network entity, comprising:
   memory; and
   at least one processor coupled to the memory and, based at least in part on information stored in the memory, the at least one processor is configured to:
   allocate a set of resources for communication with a user equipment (UE), the set of resources including a plurality of resource blocks (RBs); and
   transmit or receive interleaved resources of a transmission within a first subset of the set of resources and a second subset of the set of resources that are comprised in one or more available subbands of a first bandwidth part (BWP) configured for the UE, wherein the one or more available subbands are available based on a full duplex resource, and wherein the first subset of the set of resources and the second subset of the set of resources include the interleaved resources and are further separated based on a half of an amount of available resources based on at least on an overlap between the first BWP and the one or more available subbands.

2. The apparatus of claim 1, further comprising a transceiver coupled to the at least one processor.

3. The apparatus of claim 1, wherein a first RB of the first BWP corresponds to a first RB of the first subset in response to the first BWP having a starting position within a first subband and having an ending position within a second subband, wherein the first subband and the second subband are different.

4. The apparatus of claim 1, wherein consecutive RBs of the first subset of the set of resources and the second subset of the set of resources are separated based on the half of the amount of available RBs in the overlap between the first BWP and the one or more available subbands.

5. The apparatus of claim 4, wherein the first BWP overlaps a plurality of subbands including the one or more available subbands, wherein the first BWP has a starting position within one of the plurality of subbands, completely overlaps the one or more available subbands, and has an ending position within a different subband of the plurality of subbands.

6. The apparatus of claim 5, wherein the first subset of the set of resources and the second subset of the set of resources are within a same subband.

7. The apparatus of claim 1, wherein consecutive RBs of the first subset of the set of resources and the second subset of the set of resources are further separated based on at least one of:
   the transmission being within one or more full duplex slots,
   a configuration for the first BWP for full duplex slots and based on an amount of RBs, or
   a dynamic indication based on the amount of RBs.

8. The apparatus of claim 1, wherein the full duplex resource includes a full duplex slot or a sub-band full duplex slot.

9. The apparatus of claim 1, wherein the at least one processor is configured to interleave the resources for the transmission and is further configured to:
   transmit the transmission to the UE.

10. The apparatus of claim 1, wherein the at least one processor is configured to de-interleave the resources for the transmission and is further configured to:
    receive the transmission from the UE based on an allocation of the set of resources to the UE for an uplink transmission.

11. An apparatus for wireless communication at a network entity, comprising:
    memory; and
    at least one processor coupled to the memory and, based at least in part on information stored in the memory, the at least one processor is configured to:
    allocate a set of resources for communication with a user equipment (UE), the set of resources including a plurality of resource blocks (RBs); and
    transmit or receive interleaved resources of a transmission within a first subset of the set of resources and a second subset of the set of resources that are comprised in one or more available subbands of a first bandwidth part (BWP) configured for the UE, wherein the one or more available subbands are available based on a full duplex resource, and wherein the one or more available subbands are separated by at least one conflicting sub-band for the full duplex resource, and wherein the first subset of the set of resources and the second subset of the set of resources include the interleaved resources and are separated based on an offset applied to a separation that avoids the at least one conflicting sub-band.

12. The apparatus of claim 11, wherein the first subset of the set of resources is within a first subband of the one or more available subbands and the second subset of the set of resources is within a different subband of the one or more available subbands.

13. The apparatus of claim 11, wherein the offset is applied to each consecutive RBs of the first subset and the second subset.

14. The apparatus of claim 11, wherein the offset is configured via radio resource control (RRC) signaling.

15. The apparatus of claim 11, wherein consecutive RBs of the first subset of the set of resources and the second subset of the set of resources are further separated with the offset based on a first amount of RBs that would overlap a subband of an opposite direction exceeding a threshold.

16. An apparatus for wireless communication at a network entity, comprising:
memory; and
at least one processor coupled to the memory and, based at least in part on information stored in the memory, the at least one processor is configured to:
allocate a set of resources for communication with a user equipment (UE), the set of resources including a plurality of resource blocks (RBs); and
map a first subset of the set of resources and a second subset of the set of resources within at least a first subband within a first bandwidth part (BWP), wherein the first subset and the second subset are interleaved within the first subband based at least on an overlap between the first BWP and at least the first subband, wherein the first BWP overlaps a plurality of first subbands and at least a second subband, wherein the first BWP has a first starting position within one of the plurality of first subbands, completely overlaps the second subband, and has an ending position within a different subband of the plurality of first subbands, and wherein an offset is applied to a separation between the first subset of the set of resources and the second subset of the set of resources, wherein the second subset of the set of resources has a second starting position within the different subband of the plurality of first subbands.

17. A method of wireless communication at a network entity, comprising:
allocating a set of resources for communication with a user equipment (UE), the set of resources including a plurality of resource blocks (RBs); and
transmitting or receiving interleaved resources of a transmission within a first subset of the set of resources and a second subset of the set of resources that are comprised in one or more available subbands of a first bandwidth part (BWP) configured for the UE, wherein the one or more available subbands are available based on a full duplex resource, and wherein the first subset of the set of resources and the second subset of the set of resources include the interleaved resources and are further separated based on a half of an amount of available resources based on at least on an overlap between the first BWP and the one or more available subbands.

18. A method of wireless communication at a network entity, comprising:
allocating a set of resources for communication with a user equipment (UE), the set of resources including a plurality of resource blocks (RBs); and
transmitting or receiving interleaved resources of a transmission within a first subset of the set of resources and a second subset of the set of resources that are comprised in one or more available subbands of a first bandwidth part (BWP) configured for the UE, wherein the one or more available subbands are available based on a full duplex resource, and wherein the one or more available subbands are separated by at least one conflicting sub-band for the full duplex resource, and wherein the first subset of the set of resources and the second subset of the set of resources include the interleaved resources and are separated based on an offset to avoid the at least one conflicting sub-band.

19. An apparatus for wireless communication at a user equipment (UE), comprising:
memory; and
at least one processor coupled to the memory and, based at least in part on information stored in the memory, the at least one processor is configured to:
receive an allocation of a set of resources for communication with a network entity, the set of resources including a plurality of resource blocks (RBs); and
transmit or receive interleaved resources of a transmission within a first subset of the set of resources and a second subset of the set of resources that are comprised in one or more available subbands of a first bandwidth part (BWP) configured for the UE, wherein the one or more available subbands are available based on a full duplex resource, and wherein the first subset of the set of resources and the second subset of the set of resources include the interleaved resources and are further separated based on a half of an amount of available resources based on at least on an overlap between the first BWP and the one or more available subbands.

20. The apparatus of claim 19, further comprising a transceiver coupled to the at least one processor.

21. The apparatus of claim 19, wherein a first RB of the first BWP corresponds to a first RB of the first subset in response to the first BWP having a starting position within a first subband and having an ending position within a second subband, wherein the first subband and the second subband are different.

22. The apparatus of claim 19, wherein consecutive RBs of the first subset of the set of resources and the second subset of the set of resources are separated based on the half of the amount of available RBs in the overlap between the first BWP and the one or more available subbands.

23. The apparatus of claim 22, wherein the first BWP overlaps a plurality of subbands including the one or more available subbands, wherein the first BWP has a starting position within one of the plurality of subbands, completely overlaps the one or more available subbands, and has an ending position within a different subband of the plurality of subbands.

24. The apparatus of claim 23, wherein the first subset of the set of resources and the second subset of the set of resources are within a same subband.

25. The apparatus of claim 19, wherein consecutive RBs of the first subset of the set of resources and the second subset of the set of resources are further separated based on at least one of:
the transmission being within one or more full duplex slots,
a configuration for the first BWP for full duplex slots and based on an amount of RBs, or
a dynamic indication based on the amount of RBs.

26. The apparatus of claim 19, wherein the full duplex resource includes a full duplex slot or a sub-band full duplex slot.

27. The apparatus of claim 19, wherein the at least one processor is configured to interleave the resources for the transmission and is further configured to:
transmit the transmission based on the allocation of the set of resources.

28. The apparatus of claim 19, wherein the at least one processor is configured to de-interleave the resources for the transmission and is further configured to:
receive the transmission based on the allocation of the set of resources.

29. An apparatus for wireless communication at a user equipment (UE), comprising:
memory; and
at least one processor coupled to the memory and, based at least in part on information stored in the memory, the at least one processor is configured to:
receive an allocation of a set of resources for communication with a network entity, the set of resources including a plurality of resource blocks (RBs); and
transmit or receive interleaved resources of a transmission within a first subset of the set of resources and a second subset of the set of resources that are comprised in one or more available subbands of a first bandwidth part (BWP) configured for the UE, wherein the one or more available subbands are available based on a full duplex resource, wherein the one or more available subbands are separated by at least one conflicting sub-band for the full duplex resource, and wherein the first subset of the set of resources and the second subset of the set of resources include the interleaved resources and are separated based on an offset applied to a separation that avoids the at least one conflicting sub-band.

30. The apparatus of claim 29, wherein the first subset of the set of resources is within a first subband of the one or more available subbands and the second subset of the set of resources is within a different subband of the one or more available subbands.

31. The apparatus of claim 29, wherein the offset is applied to each consecutive RBs of the first subset of the set of resources and the second subset of the set of resources.

32. The apparatus of claim 29, wherein the offset is configured via radio resource control (RRC) signaling.

33. The apparatus of claim 29, wherein consecutive RBs of the first subset of the set of resources and the second subset of the set of resources are further separated with the offset based on a first amount of RBs that would overlap a subband of an opposite direction exceeding a threshold.

34. An apparatus for wireless communication at a user equipment (UE), comprising:
memory; and
at least one processor coupled to the memory and, based at least in part on information stored in the memory, the at least one processor is configured to:
receive an allocation of a set of resources for communication with a network entity, the set of resources including a plurality of resource blocks (RBs); and
de-interleave the set of resources to obtain a first subset of the set of resources and a second subset of the set of resources within at least a first subband within a first bandwidth part (BWP), wherein the first subset and the second subset are interleaved within the first subband based at least on an overlap between the first BWP and at least the first subband, wherein the first BWP overlaps a plurality of first subbands and at least a second subband, wherein the first BWP has a first starting position within one of the plurality of first subbands, completely overlaps the second subband, and has an ending position within a different subband of the plurality of first subbands, and wherein an offset is applied to a separation between the first subset of the set of resources and the second subset of the set of resources, wherein the second subset of the set of resources has a second starting position within the different subband of the plurality of first subbands.

35. A method of wireless communication at a user equipment (UE), comprising:
receiving an allocation of a set of resources for communication with a network entity, the set of resources comprising a plurality of resource blocks (RBs); and
transmitting or receiving interleaved resources for a transmission within a first subset of the set of resources and a second subset of the set of resources that are comprised in one or more available subbands of a first bandwidth part (BWP) configured for the UE, wherein the one or more available subbands are available based on a full duplex resource, and wherein the first subset of the set of resources and the second subset of the set of resources include the interleaved resources and are further separated based on a half of an amount of available resources based on at least on an overlap between the first BWP and the one or more available subbands.

36. A method of wireless communication at a user equipment (UE), comprising:
receiving an allocation of a set of resources for communication with a network entity, the set of resources comprising a plurality of resource blocks (RBs); and
transmitting or receiving interleaved resources for a transmission within a first subset of the set of resources and a second subset of the set of resources that are comprised in one or more available subbands of a first bandwidth part (BWP) configured for the UE, wherein the one or more available subbands are available based on a full duplex resource, wherein the one or more available subbands are separated by at least one conflicting sub-band for the full duplex resource, and wherein the first subset of the set of resources and the second subset of the set of resources include the interleaved resources and are separated based on an offset applied to a separation that avoids the at least one conflicting sub-band.

* * * * *